US012293536B2

United States Patent
Ono et al.

(10) Patent No.: US 12,293,536 B2
(45) Date of Patent: May 6, 2025

(54) INFORMATION PROCESSING DEVICE, SETTING APPARATUS, IMAGE RECOGNITION SYSTEM, ROBOT SYSTEM, SETTING METHOD, LEARNING DEVICE, AND METHOD OF GENERATING LEARNED MODEL

(71) Applicant: Kawasaki Jukogyo Kabushiki Kaisha, Kobe (JP)

(72) Inventors: Seita Ono, Kobe (JP); Kippei Matsuda, Kobe (JP); Yuki Takayama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 491 days.

(21) Appl. No.: 17/638,221

(22) PCT Filed: Aug. 26, 2020

(86) PCT No.: PCT/JP2020/032207
§ 371 (c)(1),
(2) Date: Feb. 25, 2022

(87) PCT Pub. No.: WO2021/039850
PCT Pub. Date: Mar. 4, 2021

(65) Prior Publication Data
US 2022/0292708 A1    Sep. 15, 2022

(30) Foreign Application Priority Data

Aug. 26, 2019    (JP) .................................. 2019-154103

(51) Int. Cl.
G06T 7/70     (2017.01)
G05B 19/4155     (2006.01)
(Continued)

(52) U.S. Cl.
CPC ............ *G06T 7/70* (2017.01); *G05B 19/4155* (2013.01); *G06T 1/0014* (2013.01);
(Continued)

(58) Field of Classification Search
None
See application file for complete search history.

(56) References Cited

U.S. PATENT DOCUMENTS

2016/0078074 A1\*   3/2016   Korzunov ........... G06F 16/2264
                                                                                                                                          707/743
2018/0260628 A1   9/2018   Namiki et al.
(Continued)

FOREIGN PATENT DOCUMENTS

CN     102812426 A   \*   12/2012   ......... G06F 3/04883
CN     102855082 A   \*   1/2013   ........... G06F 17/276
(Continued)

*Primary Examiner* — Jiangeng Sun
(74) *Attorney, Agent, or Firm* — XSENSUS LLP

(57) ABSTRACT

An information processing device includes position detecting circuitry configured to detect a commanded position that is a position of an object commanded on a screen where the object is projected, size detecting circuitry configured to detect a commanded size that is a size of the object commanded on the screen, positional information detecting circuitry configured to detect a position of an actual object based on the commanded position, size information detecting circuitry configured to detect a size of the actual object based on the commanded size, index processing circuitry configured to generate a position index indicative of the commanded position and a size index indicative of the size of the actual object, and display the position index and the size index on the screen, and output circuitry configured to output object information including information on the position and the size of the actual object.

22 Claims, 22 Drawing Sheets

(51) Int. Cl.
*G06T 1/00* (2006.01)
*G06T 7/00* (2017.01)
*G06T 7/60* (2017.01)
*G06V 10/774* (2022.01)
*G06V 20/50* (2022.01)

(52) U.S. Cl.
CPC .............. *G06T 7/0004* (2013.01); *G06T 7/60* (2013.01); *G06V 10/774* (2022.01); *G06V 20/50* (2022.01); *G05B 2219/50391* (2013.01); *G06T 2207/20081* (2013.01); *G06T 2207/20092* (2013.01); *G06T 2207/30108* (2013.01)

(56) References Cited

U.S. PATENT DOCUMENTS

| | | |
|---|---|---|
| 2019/0066333 A1 | 2/2019 | Furihata et al. |
| 2019/0295244 A1* | 9/2019 | Adachi ................. G06F 18/214 |

FOREIGN PATENT DOCUMENTS

| | | | | |
|---|---|---|---|---|
| CN | 107168352 A | * | 9/2017 | ........... B64C 39/024 |
| CN | 107463180 A | * | 12/2017 | ........... B64C 39/024 |
| DE | 102018121039 A1 | * | 2/2019 | ......... G06K 9/00442 |
| JP | 2009-241247 A | | 10/2009 | |
| JP | 2013-173209 A | | 9/2013 | |
| JP | 2019-46095 A | | 3/2019 | |
| KR | 20160044194 A | * | 4/2016 | |

* cited by examiner

| INPUT DATA | TEACHING DATA | |
|---|---|---|
| LEARNING IMAGE | CLASS | POSITION |
| IMG001 | TRANSPARENT BOTTLE LARGE | x1,y1,w1,h1 |
| IMG002 | TRANSPARENT BOTTLE SMALL | x2,y2,w2,h2 |
| IMG003 | COLORED BOTTLE LARGE | x3,y3,w3,h3 |
| IMG004 | COLORED BOTTLE SMALL | x4,y4,w4,h4 | ated, a setting apparatus, an image recognition system, a robot system, a setting method, a learning device, and a method of generating a learned model.

INFORMATION PROCESSING DEVICE, SETTING APPARATUS, IMAGE RECOGNITION SYSTEM, ROBOT SYSTEM, SETTING METHOD, LEARNING DEVICE, AND METHOD OF GENERATING LEARNED MODEL

CROSS-REFERENCE TO RELATED APPLICATIONS

This application is based on PCT filing PCT/JP2020/032207, filed Aug. 26, 2020, which claims the priority of JP2019-154103 filed in Japan Patent Office on Aug. 26, 2019, which are incorporated as a part of this application with reference to the entirety.

TECHNICAL FIELD

The present disclosure relates to an information processing device, a setting apparatus, an image recognition system, a robot system, a setting method, a learning device, and a method of generating a learned model.

BACKGROUND ART

Conventionally, there are robots for controlling operation using an image obtained by imaging a workpiece. For example, Patent Document 1 discloses a device which measures a three-dimensional (3D) position and 3D posture of the workpiece using the workpiece image captured by a camera, and controls a tip-end part of a robotic arm and a robot hand by using the measured information.

REFERENCE DOCUMENT OF CONVENTIONAL ART

Patent Document

[Patent Document 1] JP2009-241247A

DESCRIPTION OF THE DISCLOSURE

For example, in a work environment where workpieces are disposed at random, two workpieces may overlap with each other. In such a case, the device of Patent Document 1 may detect the overlapping workpieces as one workpiece, or may not detect them as workpiece(s). For this reason, a correction or an addition of the workpiece is needed in the detection result.

Therefore, one purpose of the present disclosure is to provide an information processing device, a setting apparatus, an image recognition system, a robot system, a setting method, a learning device, and a method of generating a learned model, which enable a setup for recognizing an object, such as a workpiece, included in an image.

In order to achieve the purpose, according to one aspect of the present disclosure, an information processing device is provided, which includes a position detecting module configured to detect a commanded position that is a position of an object commanded on a screen where the object is projected, an attribute detecting module configured to detect a commanded attribute that is an attribute of the object commanded on the screen, a positional information detecting module configured to detect a position of an actual object based on the commanded position, an attribute information detecting module configured to detect an attribute of the actual object based on the commanded attribute, an index processing module configured to generate a position index indicative of the commanded position and an attribute index indicative of the attribute of the actual object, and display the position index and the attribute index on the screen, and an output module configured to output object information including information on the position and the attribute of the actual object.

According to another aspect of the present disclosure, an information processing device is provided, which includes a position detecting module configured to detect a commanded position that is a position of an object commanded on a screen where the object is projected, a size detecting module configured to detect a commanded size that is a size of the object commanded on the screen, a positional information detecting module configured to detect a position of an actual object based on the commanded position, a size information detecting module configured to detect a size of the actual object based on the commanded size, an index processing module configured to generate a position index indicative of the commanded position and a size index indicative of the size of the actual object, and display the position index and the size index on the screen, and an output module configured to output object information including information on the position and the size of the actual object.

According to still another aspect of the present disclosure, an information processing device is provided, which includes a position detecting module configured to detect a commanded position that is a position of an object commanded on a screen where the object is projected, a posture detecting module configured to detect a commanded posture that is a posture of the object commanded on the screen, a positional information detecting module configured to detect a position of an actual object based on the commanded position, a posture information detecting module configured to detect a posture of the actual object based on the commanded posture, an index processing module configured to generate a position index indicative of the commanded position and a posture index indicative of the posture of the actual object, and display the position index and the posture index on the screen, and an output module configured to output object information including information on the position and the posture of the actual object.

According to one aspect of the present disclosure, a learning device is provided, which includes an acquiring module configured to acquire a learning image, and a position and an attribute of an object included in the learning image, and a learning module configured to generate a learned model for estimating the position and the attribute of the object from the image by machine learning, the learned model using the learning image as input data, and using the position and the attribute of the object as teaching data.

According to one aspect of the present disclosure, a method of generating a learned model is provided, which includes the steps of acquiring a learning image, and a position and an attribute of an object included in the learning image, and generating the learned model for estimating the position and the attribute of the object from the image by machine learning, the learned model using the learning image as input data, and using the position and the attribute of the object as teaching data.

According to one aspect of the present disclosure, a setting apparatus is provided, which includes the information processing device according to the aspect of the present disclosure, a display that displays the screen, and an inputter that accepts an input of the command and output the command to the information processing device.

According to one aspect of the present disclosure, an image recognition system is provided, which includes the setting apparatus according to the aspect of the present disclosure, and an image capture that captures an image of an actual object and outputs the captured image to the setting apparatus.

According to one aspect of the present disclosure, a robot system is provided, which includes the image recognition system according to the aspect of the present disclosure, a robot that performs a processing work to an actual object, and a controller that controls the robot. The controller recognizes the actual object by using the object information outputted from the output module of the information processing device, and causes the robot to process the actual object.

According to one aspect of the present disclosure, a method of setting a position and a size of an object to recognize an actual object corresponding to the object projected on a screen, is provided. The method includes the steps of detecting a commanded position that is a position of the object commanded on the screen, detecting a commanded size that is a size of the object commanded on the screen, detecting a position of the actual object based on the commanded position, detecting a size of the actual object based on the commanded size, generating a position index indicative of the commanded position and a size index indicative of the size of the actual object, and displaying the position index and the size index on the screen, and outputting object information including information on the position and the size of the actual object.

According to another aspect of the present disclosure, a method of setting a position and a posture of an object to recognize an actual object corresponding to the object projected on a screen, is provided. The method includes the steps of detecting a commanded position that is a position of the object commanded on the screen, detecting a commanded posture that is a posture of the object commanded on the screen, detecting a position of the actual object based on the commanded position, detecting a posture of the actual object based on the commanded posture, generating a position index indicative of the commanded position and a posture index indicative of the commanded posture, and displaying the position index and the posture index on the screen, and outputting object information including information on the position and the posture of the actual object.

According to the technology of the present disclosure, a setup for recognizing an object included in an image becomes possible.

MODES FOR CARRYING OUT THE DISCLOSURE

Figure 1:
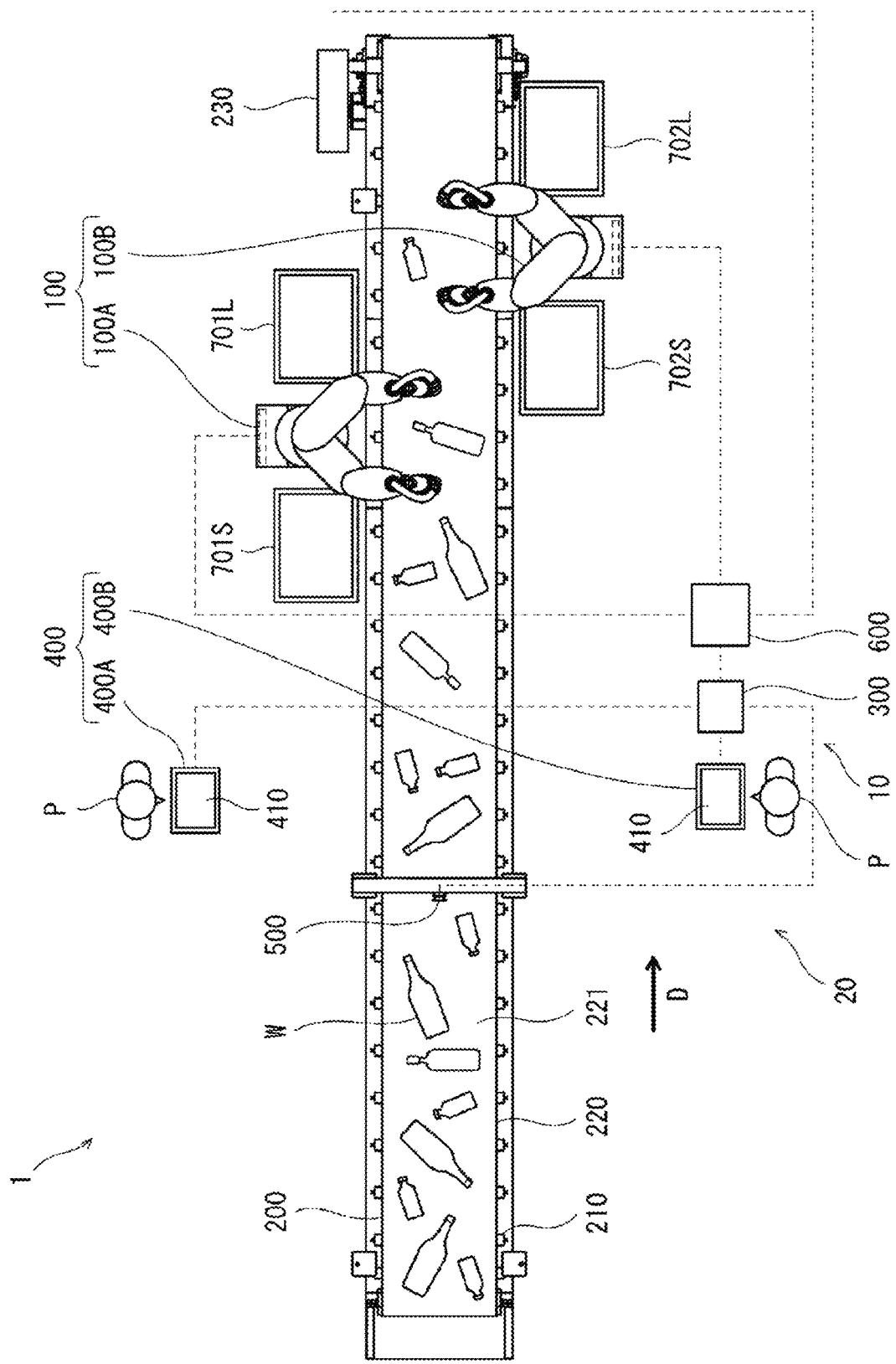
FIG. 1 is a plan view illustrating one example of a configuration of a robot system according to one embodiment.

Hereinafter, one embodiment of the present disclosure is described with reference to the drawings. Note that the embodiment which will be described below is to illustrate a comprehensive or concrete example. Components which are not cited in the independent claim that is the broadest concept among components in the following embodiment will be described as arbitrary components. Each figure in the accompanying drawings is a schematic figure, and is not necessarily illustrated exactly. Moreover, in each figure, the same reference characters are assigned to substantially the same components, and therefore, redundant description may be omitted or simplified. The term "device" or "apparatus" as used in this specification and the appended claims may mean a system comprised of devices or apparatuses, other than meaning a sole device or apparatus.

<Configuration of Robot System>

Figure 2:
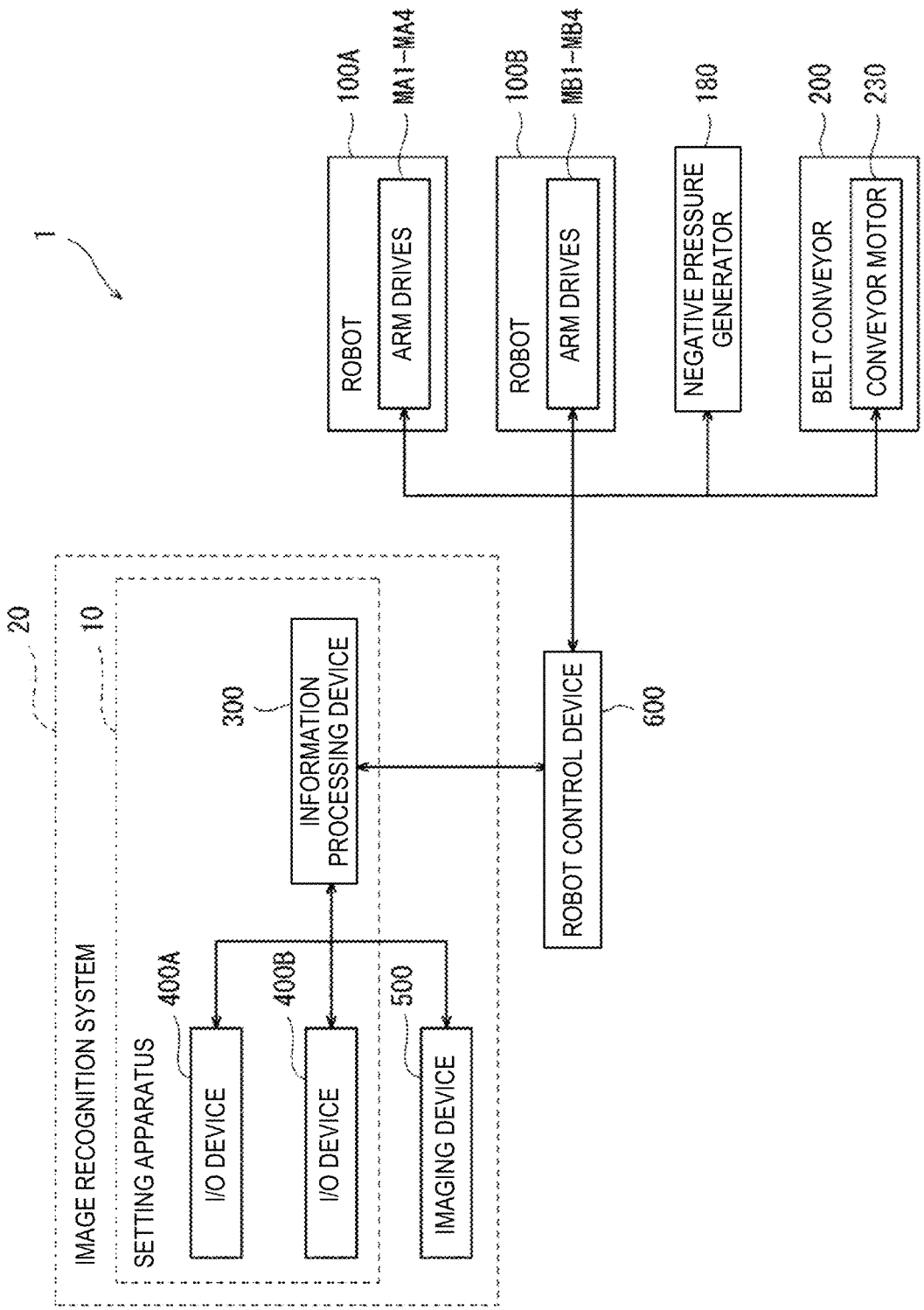
FIG. 2 is a block diagram illustrating one example of the configuration of the robot system according to this embodiment.

A configuration of a robot system 1 according to one embodiment is described. FIG. 1 is a plan view illustrating one example of a configuration of the robot system 1 according to this embodiment. FIG. 2 is a block diagram illustrating one example of the configuration of the robot system 1 according to this embodiment.

As illustrated in FIG. 1, in this embodiment, the robot system 1 will be described as a system in which a robot 100 classifies objects W placed at random on a belt conveyor 200. Although the object W is not limited in particular, it is a waste in this embodiment, and in detail, it is an empty bottle (hereinafter, may also be referred to as a "bottle W"). Note that the robot system 1 is not limited to the system for classifying the object W, but, for example, it may be a system which performs a work, such as picking, arranging, or processing of the object W. That is, the robot system 1 may be a system which performs a work accompanied by identifying of the position where the object W exists or the position where the object W is to be disposed.

The robot system 1 according to this embodiment includes at least one robot 100, the belt conveyor 200, an information processing device 300, an I/O device 400, an imaging device 500, and a robot control device 600. As illustrated in FIG. 2, the information processing device 300 and the I/O device 400 constitute a setting apparatus 10. The information processing device 300, the I/O device 400, and the imaging device 500 constitute an image recognition system 20.

As illustrated in FIG. 1, the belt conveyor 200 moves its conveyance surface 221 in a direction D to transfer the bottle W on the conveyance surface 221 in the direction D. The belt conveyor 200 includes rollers 210 lined up in the direction D, a transportation belt 220 having an endless-track shape which is wound around the rollers 210, and a conveyor motor 230 as an electric motor which rotates the rollers 210. The conveyance surface 221 is an outer circumferential surface of the transportation belt 220 which is oriented upward.

Two robots 100A and 100B are disposed on both sides of the belt conveyor 200, at downstream locations in the direction D. The robots 100A and 100B are industrial robots. Below, when distinguishing the two robots from each other, they are expressed as "the robot 100A" and "the robot 100B," and when not distinguishing one from the other, one may be expressed as "the robot 100."

The robot 100A sorts out and takes out transparent bottles (hereinafter, may also be referred to as "the transparent bottles") among bottles W on the belt conveyor 200 in accordance with a control by the robot control device 600 into two classifications according to the size (transparent bottles WTL and WTS), that is, it classifies the bottles, and feeds them into collection boxes 701L and 701S. The transparent bottle WTL is a bottle of larger size classification (hereinafter, may also be referred to as "the large size classification") and is fed into the collection box 701L, and the transparent bottle WTS is a bottle of smaller size classification (hereinafter, may also be referred to as "the small size classification") and is fed into the collection box 701S.

The robot 100B sorts out and takes out colored bottles, such as brown bottles (hereinafter, may also be referred to as "the colored bottles"), among the bottles W on the belt conveyor 200 according to the control by the robot control device 600 into colored bottles WCL and WCS of the large size classification and the small size classification, that is, it classifies the bottles, and feeds them into collection boxes 702L and 702S. The colored bottle WCL is fed into the collection box 702L, and the colored bottle WCS is fed into the collection box 702S.

Figure 3:
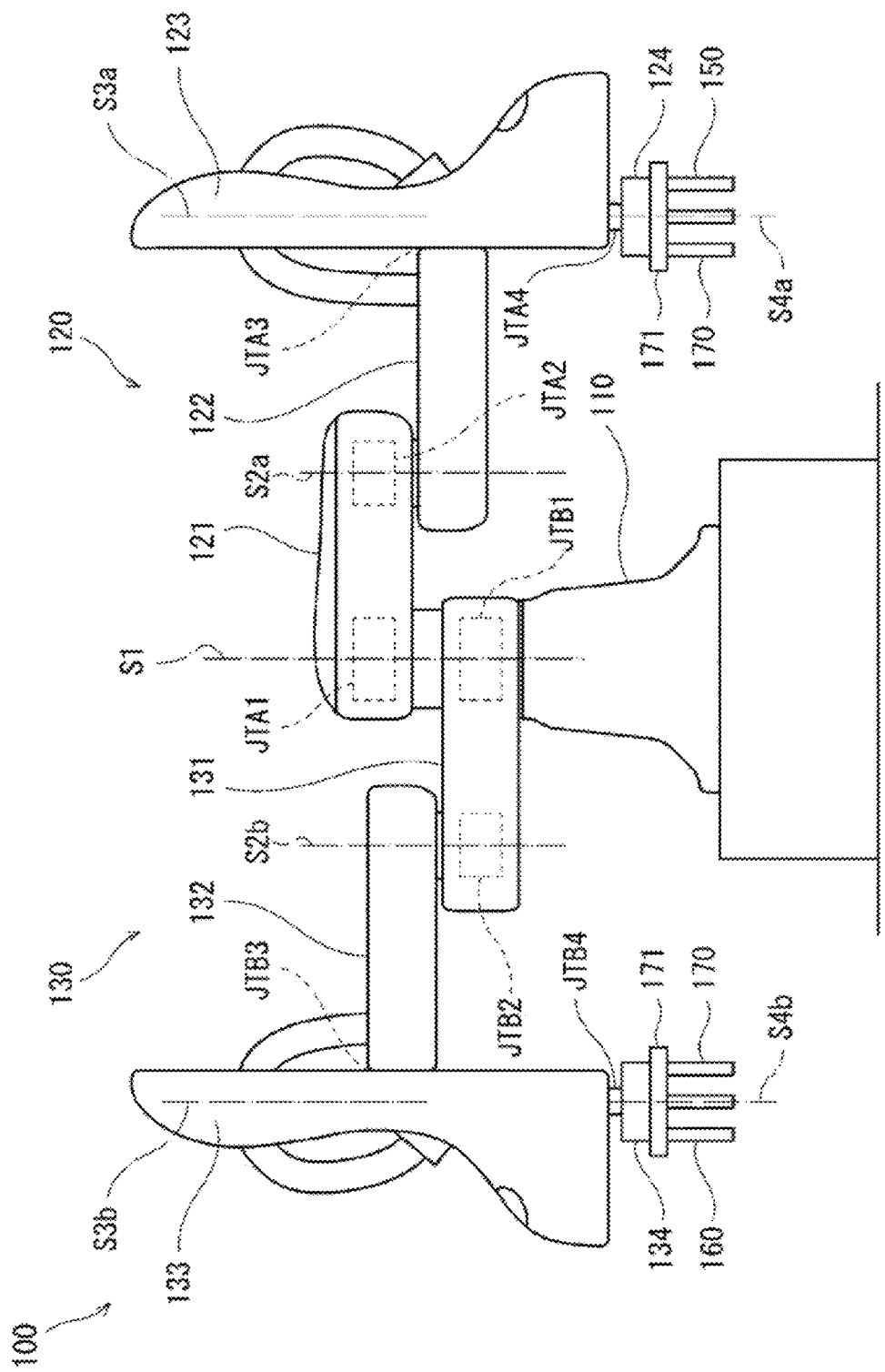
FIG. 3 is a side view illustrating one example of a configuration of a robot according to this embodiment.

FIG. 3 is a side view illustrating one example of a configuration of the robot 100 according to this embodiment. As illustrated in FIGS. 1 and 3, the robots 100A and 100B (i.e., the robot 100) are dual-arm robots provided with a pedestal 110, and two arms 120 and 130 disposed at the pedestal 110. In detail, the robot 100 is a coaxial dual-arm robot in which the arms 120 and 130 are pivotable in a horizontal plane, coaxially centering on a first axis S1 in the vertical direction. The arms 120 and 130 constitute a horizontal articulated robotic arm. The robot 100 is provided with end effectors 150 and 160 for holding the bottles W at tip ends of the arms 120 and 130, respectively. The end effectors 150 and 160 may have any configuration as long as they can hold and transfer the bottle W, and, in this embodiment, they suck the bottles W with negative pressure. The configuration of the end effectors 150 and 160 for holding the objects is not limited to the configuration using the suction, but it may be a configuration using grasping or gripping, dipping up or scooping, lifting up, engaging, adhesive force, magnetic force, etc.

The arm 120 includes links 121-124 and arm drives MA1-MA4 (see FIG. 2). The arm 130 includes links 131-134 and arm drives MB1-MB4 (see FIG. 2). The arm drives MA1-MA4 and MB1-MB4 include electric motors etc., and, in this embodiment, they include servomotors. The drive of the arm drives MA1-MA4 and MB1-MB4 are controlled by the robot control device 600.

The first links 121 and 131 are connected with the pedestal 110 via rotary joints JTA1 and JTB1 so as to be independently rotatable from each other centering on the first axis S1 in a horizontal plane, respectively. The first links 121 and 131 are disposed so as to be differentiated in the direction of the first axis S1 so that the mutual interference during the rotation is suppressed. The second links 122 and 132 are connected with tip ends of the first links 121 and 131 via rotary joints JTA2 and JTB2 so as to be rotatable in a horizontal plane centering on second axes S2a and S2b in the vertical direction, respectively. The third links 123 and 133 are connected with tip ends of the second links 122 and 132 via prismatic joints JTA3 and JTB3 so as to be ascendable and descendible along third axes S3a and S3b in the vertical direction, respectively. The fourth links 124 and 134 are connected with lower ends of the third links 123 and 133 via rotary joints JTA4 and JTB4 so as to be rotatable centering on fourth axes S4a and S4b in the longitudinal direction of the third links 123 and 133, respectively. The fourth axes S4a and S4b are also axes in the vertical direction. Each of the fourth links 124 and 134 constitutes a mechanical interface for being connected with the end effectors 150 and 160, respectively.

The arm drives MA1-MA4 drive the joints JTA1-JTA4 to rotate, or raise and lower the links 121-124, respectively. The arm drives MB1-MB4 drive the joints JTB1-JTB4 to rotate, or raise and lower the links 131-134, respectively.

The end effectors 150 and 160 are each provided with a support body 171, and suction nozzles 170 arranged on the support body 171 so as to be a rectangular shape. The end effectors 150 and 160 may have similar configurations, and, for example, they may have different configurations according to the quantity and the arrangement of the suction nozzles 170.

The suction nozzles 170 each has a hollow cylindrical shape, and are connected with a negative pressure generator 180 (see FIG. 2) via piping. The suction nozzles 170 suck the object at tip ends with negative pressure generated by the negative pressure generator 180. The configuration of the negative pressure generator 180 is not limited in particular as long as it can generate the negative pressure at the suction nozzles 170, and it may use any kind of existing configurations. For example, the negative pressure generator 180 may have a configuration of a vacuum pump or a pneumatic cylinder which generates negative pressure or vacuum by sucking air, or may have a configuration of an ejector which generates negative pressure or vacuum by feeding compressed air. Operation of the negative pressure generator 180 is controlled by the robot control device 600.

The robots 100A and 100B transfer the bottle WTL or WCL of the large size classification by using the arm 120 and the end effector 150, and transfer the bottle WTS or WCS of the small size classification by using the arm 130 and the end effector 160, respectively.

As illustrated in FIGS. 1 and 2, the information processing device 300 is communicatably connected with the I/O devices 400A and 400B, the imaging device 500, and the robot control device 600 wiredly or wirelessly. Below, when distinguishing the two I/O devices from each other, they are expressed as "the I/O device 400A" and "the I/O device 400B," and when not distinguishing one from the other, one may be expressed as "the I/O device 400." The robot control device 600 is communicatably connected with the arm drives MA1-MA4 and MB1-MB4 of the robots 100A and 100B, the negative pressure generator 180, the conveyor motor 230 of the belt conveyor 200, and the information processing device 300 wiredly or wirelessly. The types of the wired communication and the wireless communication are not limited in particular. For example, the wired communication and the wireless communication may include wired or wireless LAN (Local Area Network).

The robot control device 600 controls operations of the arm drives MA1-MA4 and MB1-MB4, the negative pressure generator 180, and the conveyor motor 230. For example, the robot control device 600 receives information on each bottle W on the belt conveyor 200 from the information processing device 300. The information on the bottle W includes a color classification such as colored or transparent, a position, a size, and a posture of the bottle W. The robot control device 600 recognizes a bottle based on the information on each bottle W, operates the arms 120 and 130 of the robots 100A and 100B, and the suction nozzles 170 of the end effectors 150 and 160 to classify each bottle W. The recognition of the bottle is to identify the existence, the color, the position, the posture, and the size of the bottle. The robot control device 600 can operate the robots 100A and 100B, the negative pressure generator 180, and the belt conveyor 200 so as to cooperate, harmonize and/or collaborate with each other.

The imaging device 500 is disposed above the belt conveyor 200, upstream in the direction D from the robots 100A and 100B, and images the conveyance surface 221 therebelow. The imaging device 500 outputs a captured image to the information processing device 300. Although the imaging device 500 images according to the control by the information processing device 300, it may image according to the control by the robot control device 600. The imaging device 500 is a camera which captures a digital image, and is a camera which enables a detection of the 3D position, such as a distance to a photographic object within the image. Examples of such a camera are a stereoscopic camera, a monocular camera, a TOF camera (Time-Of-Flight Camera), a pattern light projection camera such as striped projection, or a camera using light-section method. In this embodiment, the imaging device 500 is the stereoscopic camera. Note that, in this embodiment, since a spatial relationship between the position and the imaging direction of the imaging device 500, and the imaging target part of the conveyance surface 221 is fixed and known, the detection of the 3D position of the photographic object within the image is possible, even if the imaging device 500 is simply a camera.

The I/O devices 400A and 400B are each provided with a display and an input device, and, in this embodiment, each has a touchscreen 410 including a function of the display and a function of the input device. Although examples of the display is a liquid crystal display (LCD) and an organic or inorganic EL (Electro-Luminescence) display, the display is not limited to these. For example, the I/O devices 400A and 400B may be a display unit provided with the touchscreen 410, and a smart device such as a smartphone and a tablet. The I/O devices 400A and 400B are disposed corresponding to the robots 100A and 100B. The I/O devices 400A and 400B can display, on a screen of the touchscreen 410, the image captured by the imaging device 500 and a bottle index that is generated by the information processing device 300 in a superimposed manner. The bottle index is an index indicative of information on the bottle W which is the object, and is an object index. The I/O devices 400A and 400B acquire a contact position of a user's finger or a pen to the touchscreen 410 (may also be referred to as "the tapped location") and a contact locus as input information, and output it to the information processing device 300.

The information processing device 300 is a device for processing and outputting various information. For example, the information processing device 300 carries out an image processing of the image captured by the imaging device 500, and outputs and displays it to/on the I/O devices 400A and 400B. The information processing device 300 outputs the processed images at imaging time points of a given interval to the I/O devices 400A and 400B so that an operator P who is the user can perform the processing while looking at the screens of the I/O devices 400A and 400B.

In detail, the information processing device 300 carries out the image processing of the image captured by the imaging device 500 to extract a bottle image WI which is an image of the bottle W projected on this image, and further detect information on the bottle W including the position, size, posture, and color classification of the actual bottle W. The information on the bottle W is one example of object information.

The information on the position of the actual bottle W may be information from which the position of this bottle W can be identified. The position of the bottle W may be a position at any part of the bottle W, and may be expressed by either a three-dimensional (3D) position or a two-dimensional (2D) position. For example, the 3D position of the bottle W may be expressed by 3D coordinates which is set in a space where the robot system 1 exists. The 2D position of the bottle W may be expressed by 2D coordinates on the basis of the conveyance surface 221 of the belt conveyor 200. In this embodiment, the position of the actual bottle W is a 3D position at a specific point of the bottle W, such as the center of gravity.

The information on the posture of the actual bottle W may be information from which the posture of this bottle W can be identified. The posture of the bottle W may be the posture on the basis of any part of the bottle W, and may be expressed by either the 3D posture or the 2D posture. For example, the 3D posture of the bottle W may be expressed by the 3D coordinates similar to the 3D position of the bottle W, and the 2D posture of the bottle W may be expressed by the 2D coordinates similar to the 2D position of the bottle W. In this embodiment, the posture of the bottle W is the orientation of the bottle W, and, in detail, it is the orientation of the longitudinal direction of the bottle W which connects the bottom and the spout.

The information on the size of the actual bottle W may be information from which the size of this bottle W can be identified. The size of the bottle W may be the size of any part of the bottle W, and may be expressed by either the 3D size or the 2D size. For example, the size may be a dimension, a converted value of the dimension, a dimension range, a converted value of the dimension range, and class. The class is a class classified for every dimension range, and the size classification is one example of the class. For example, the 3D size of the bottle W may be the size in the 3D coordinate system similar to the 3D position of the bottle W, and the 2D size of the bottle W may be the size in the 2D coordinate system similar to the 2D position of the bottle W. In this embodiment, the size of the bottle W is the size classification and, in detail, it is the size classification about the length of the bottle W in the longitudinal direction which connects the bottom and the spout.

The information processing device 300 outputs the information on the bottle W to the robot control device 600. Further, the information processing device 300 generates the bottle index for displaying the position, the size, and the posture of the actual bottle W on the touchscreen 410, and outputs the image data of this bottle index to the I/O devices 400A and 400B. The information processing device 300 outputs the image data of the bottle indexes of the transparent bottles WTL and WTS to the I/O device 400A, and outputs the image data of the bottle indexes of the colored bottles WCL and WCS to the I/O device 400B.

The information processing device 300 receives the information inputted into the touchscreen 410 from the I/O devices 400A and 400B, and processes this information. For example, the I/O devices 400A and 400B can accept an input for generating a new bottle index and displaying it on the touchscreen 410 by operation of the operator P. Further, the I/O devices 400A and 400B can accept an input for correcting or deleting the bottle index of the bottle W displayed on the touchscreen 410 by operation of the operator P.

When the input information for generating the new bottle index is received from the I/O device 400A or 400B, the information processing device 300 generates the image data of the new bottle indexes according to this input information, and outputs it to the I/O device 400A or 400B. Further, the information processing device 300 detects the information on the bottle W including the position, size, posture, and color classification of the actual bottle W corresponding to the new bottle index, and outputs it to the robot control device 600.

When the input information for correcting or deleting the bottle index is received from the I/O device 400A or 400B, the information processing device 300 generates the image data of the bottle index that is corrected or deleted according to this input information, and outputs it to the I/O device 400A or 400B. Further, the information processing device 300 detects the information on the actual bottle W corresponding to the corrected or deleted bottle index, and outputs it to the robot control device 600.

In this embodiment, the information processing device 300 is a computer apparatus which is provided separately from the I/O device 400 and the robot control device 600. For example, the information processing device 300 may be an electronic control unit (ECU), a personal computer, etc. However, the information processing device 300 may be incorporated into and integrated with the I/O device 400 or the robot control device 600.

[Hardware Configuration of Information Processing Device]

Figure 4:
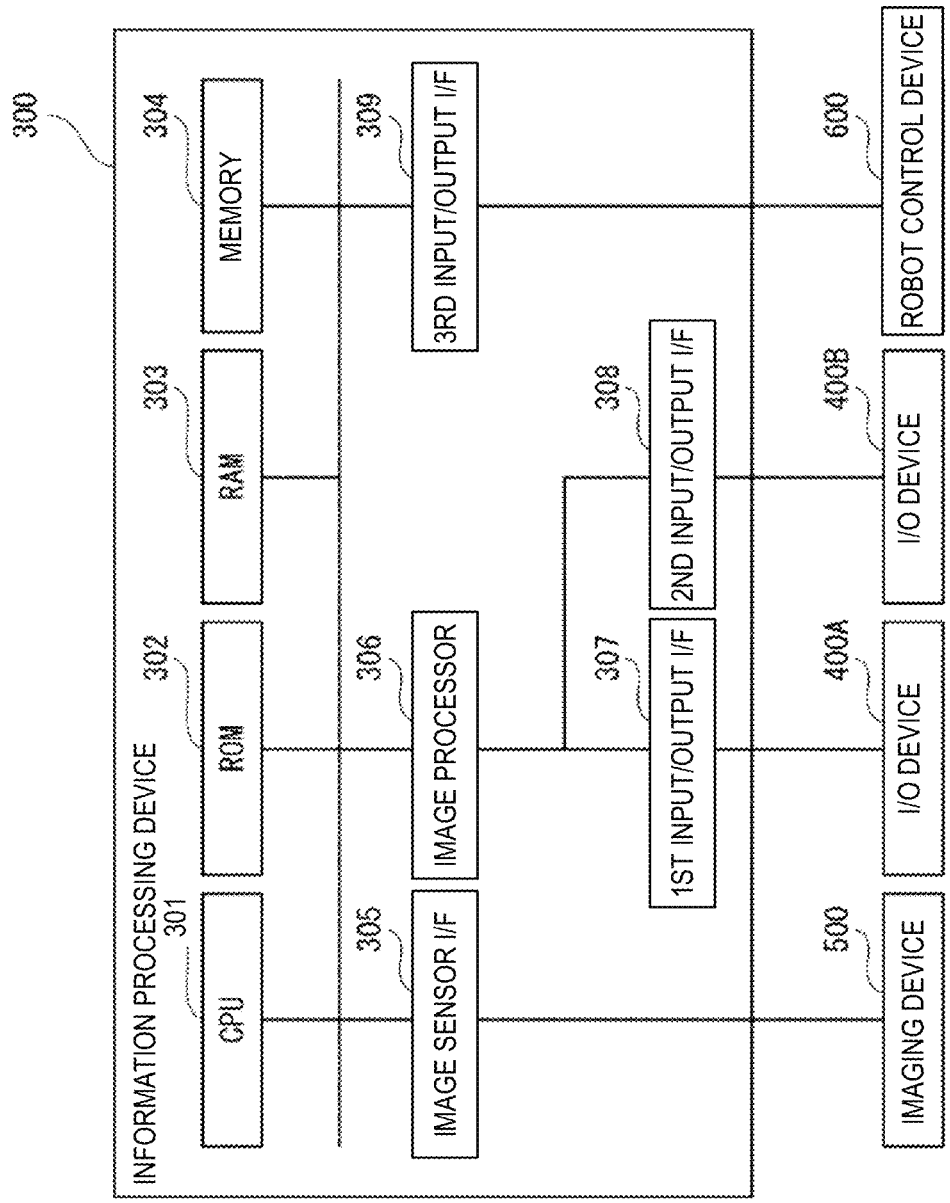
FIG. 4 is a block diagram illustrating one example of a hardware configuration of an information processing device according to this embodiment.

FIG. 4 is a block diagram illustrating one example of a hardware configuration of the information processing device 300 according to this embodiment. As illustrated in FIG. 4, the information processing device 300 includes, as components, a CPU (Central Processing Unit) 301, a ROM (Read Only Memory) 302, a RAM (Random Access Memory) 303, a memory 304, an image sensor I/F (interface) 305, an image processor 306, and an input/output I/Fs 307-309. The components described above are connected with each other via bus, wired communications, or wireless communications. Note that not all the components described above are essential.

For example, the CPU 301 is a processor, and controls the entire operation of the information processing device 300. The ROM 302 is comprised of a nonvolatile semiconductor memory, and stores a program and data for causing the CPU 301 to control the operation. The RAM 303 is comprised of a volatile semiconductor memory, and temporarily stores the program executed by the CPU 301, and processing data or processed data. The memory 304 is comprised of a semiconductor memory such as a volatile memory and a nonvolatile memory, or a storage device such as a hard disc drive (HDD) and a SSD (Solid State Drive).

For example, the program for operating the CPU 301 is held beforehand in the ROM 302 or the memory 304. The CPU 301 reads the program from the ROM 302 or the memory 304, and develops it in the RAM 303. The CPU 301 executes each coded command in the program developed in the RAM 303.

Each function of the information processing device 300 may be implemented by a computer system comprised of the CPU 301, the ROM 302, and the RAM 303, may be implemented by hardware circuitry for exclusive use such as a electronic circuit or an integrated circuit, or may be implemented by a combination of the computer system and the hardware circuitry.

For example, such an information processing device 300 may be comprised of a microcontroller, a MPU (Micro Processing Unit), a LSI (Large Scale Integration), a system LSI, a PLC (Programmable Logic Controller), and a logical circuit. Functions of the information processing device 300 may be implemented by individually formed in a chip, or may be implemented by a sole chip which includes a part or all of the functions. Further, the circuit may be a general-purpose circuit, or may be a circuit for exclusive use. As the LSI, an FPGA (Field Programmable Gate Array) which can be programmed after a LSI production, a reconfigurable processor in which the connection and/or the setup of the circuit cells inside the LSI can be reconfigured, or an ASIC (Application Specific Integrated Circuit) in which circuits for functions are integrated into one piece for a particular application, may be used.

The image sensor I/F 305 controls the drive of the image sensor (not illustrated) of the imaging device 500 according to a command from the CPU 301. The image sensor I/F 305 takes into the RAM 303 or the memory 304 the data of the image captured by the imaging device 500. The image sensor I/F 305 may include a circuit for the drive of the image sensor.

The image processor 306 is provided with a GPU (Graphics Processing Unit) which can generate a screen to be displayed on the I/O devices 400A and 400B. The image processor 306 generates image data according to a command from the CPU 301, and outputs it to the I/O devices 400A and 400B. For example, the image processor 306 generates image data generated by processing the image data captured by the imaging device 500, and image data indicative of information generated corresponding to the information inputted into the I/O devices 400A and 400B.

The first input/output I/F 307 is connected with the image processor 306 and the I/O device 400A, and outputs and inputs the image data, information, and command to the I/O device 400A. The second input/output I/F 308 is connected with the image processor 306 and the I/O device 400B, and inputs and outputs the image data, information, and command to the I/O device 400B. The third input/output I/F 309 is connected with the robot control device 600, and outputs and inputs the information and command to the robot control device 600. The input/output I/Fs 307-309 may include a circuit for converting a signal.

[Hardware Configuration of Robot Control Device]

Figure 5:
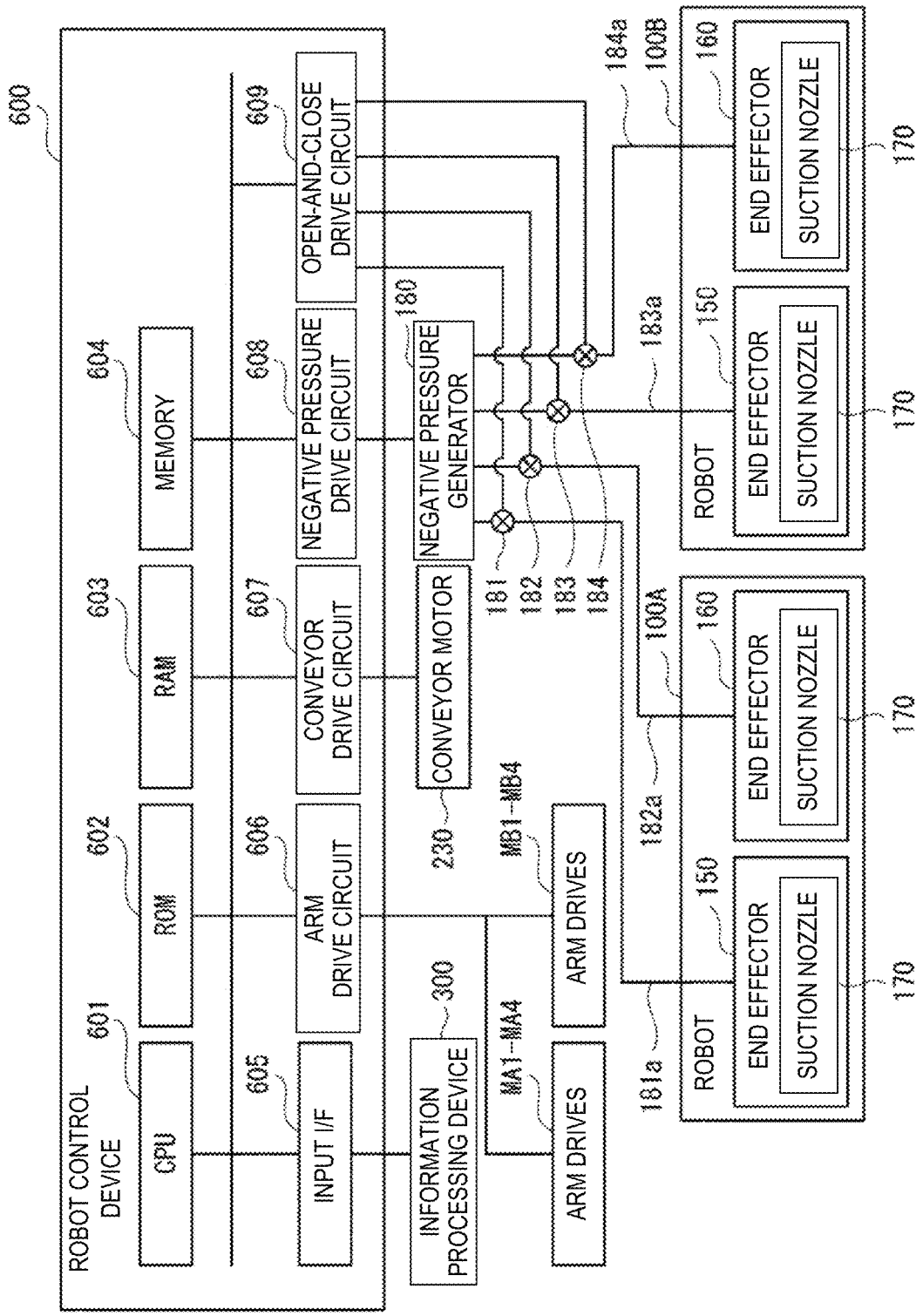
FIG. 5 is a block diagram illustrating one example of a hardware configuration of a robot control device according to this embodiment.

FIG. 5 is a block diagram illustrating one example of a hardware configuration of the robot control device 600 according to this embodiment. As illustrated in FIG. 5, the robot control device 600 includes, as components, a CPU 601, a ROM 602, a RAM 603, a memory 604, an input/output I/F 605, an arm drive circuit 606, a conveyor drive circuit 607, a negative pressure drive circuit 608, and an open-and-close drive circuit 609. The components described above are connected with each other via a bus, wired communications, or wireless communications. Note that not all the components described above are essential. In this embodiment, although one robot control device 600 is provided for the robots 100A and 100B, the robot control device 600 may be provided for each of the robots 100A and 100B.

The configuration and function of each of the CPU 601, the ROM 602, the RAM 603, and the memory 604 are similar to those of the CPU 301, the ROM 302, the RAM 303, and the memory 304 of the information processing device 300. The CPU 601 controls the entire processing and operation of the robot control device 600. Each function of the robot control device 600 may be implemented by a computer system comprised of the CPU 601, the ROM 602, and the RAM 603, may be implemented by hardware circuitry for exclusive use such as an electronic circuit or an integrated circuit, or may be implemented by a combination of the computer system and the hardware circuitry.

The input/output I/F 605 is connected with the information processing device 300, and outputs and inputs the information and command to the information processing device 300. The input/output I/F 605 may include a circuit for converting a signal. The arm drive circuit 606 feeds electric power to the servomotors of the arm drives MA1-MA4 and MB1-MB4 of the robots 100A and 100B according to a command from the CPU 601 to control the drive of each servomotor. The conveyor drive circuit 607 feeds electric power to the conveyor motor 230 of the belt conveyor 200 according to a command from the CPU 601 to control the drive of the conveyor motor 230. The negative pressure drive circuit 608 feeds electric power to the negative pressure generator 180 according to a command from the CPU 601 to control the drive of the negative pressure generator 180.

The open-and-close drive circuit 609 controls the drive of open-and-close devices 181-184 according to a command from the CPU 601. The open-and-close devices 181 and 182 allow or intercept a flow through piping systems 181$a$ and 182$a$, respectively. The piping systems 181$a$ and 182$a$ connect the suction nozzles 170 of the end effectors 150 and 160 of the robot 100A to the negative pressure generator 180, respectively. The open-and-close devices 183 and 184 allow or intercept a flow through piping systems 183$a$ and 184$a$, respectively. The piping systems 183$a$ and 184$a$ connect the suction nozzles 170 of the end effectors 150 and 160 of the robot 100B to the negative pressure generator 180, respectively. One example of the open-and-close devices 181-184 are on-off valves comprised of electromagnetic valves.

[Functional Configuration of Information Processing Device]

Figure 6:
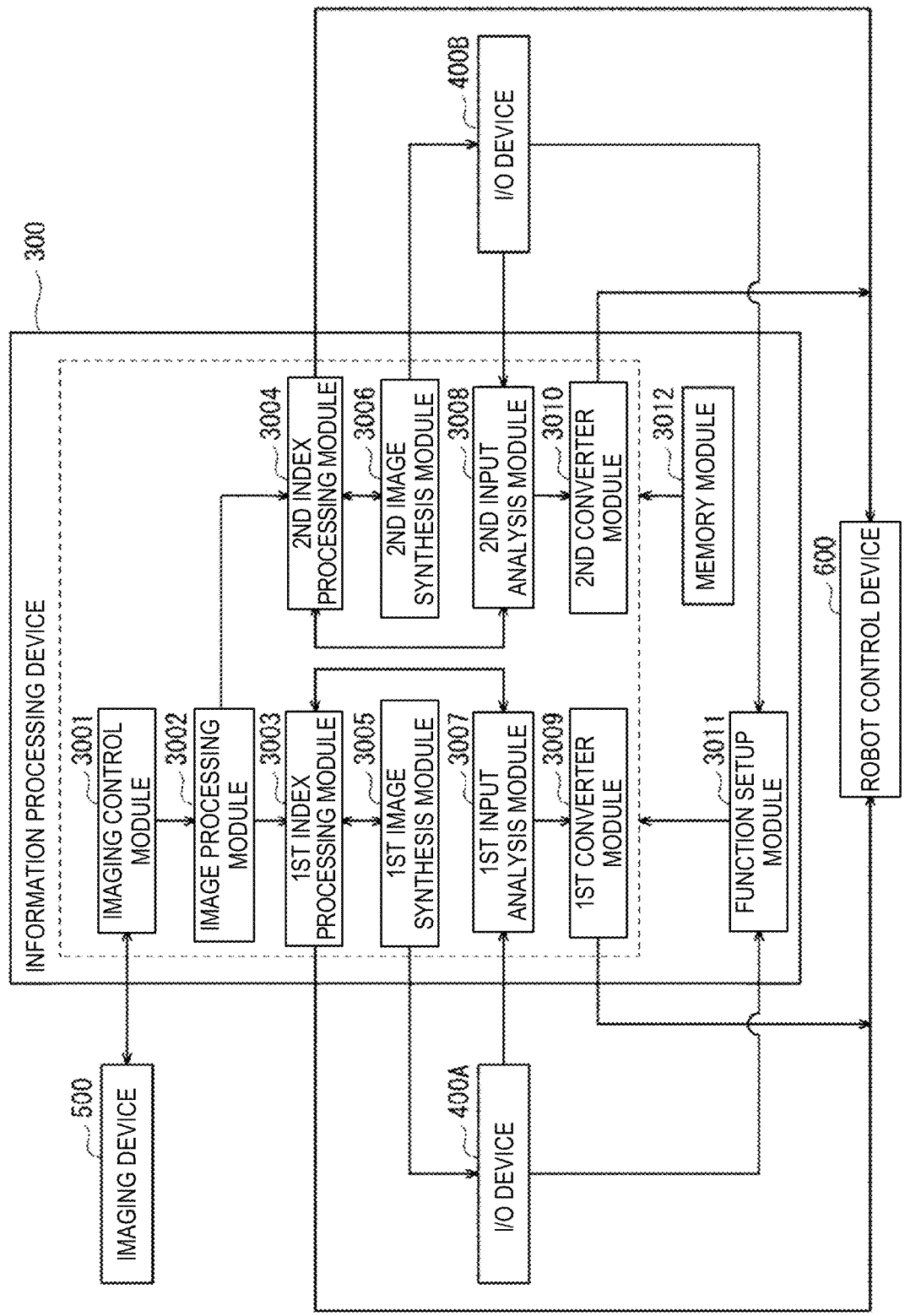
FIG. 6 is a block diagram illustrating one example of a functional configuration of the information processing device according to this embodiment.

FIG. 6 is a block diagram illustrating one example of a functional configuration of the information processing device 300 according to this embodiment. As illustrated in FIG. 6, the information processing device 300 includes, as functional components, an imaging control module 3001, an image processing module 3002, index processing modules 3003 and 3004, image synthesis modules 3005 and 3006, input analysis modules 3007 and 3008, converter modules 3009 and 3010, a function setup module 3011, and a memory module 3012. Note that not all the functional components described above are essential.

The functions of the functional components other than the memory module 3012 are implemented by the CPU 301, and the function of the memory module 3012 is implemented by the memory 304, and the ROM 302 and/or the RAM 303.

The memory module 3012 stores various information, and enables a read-out of the stored information. The memory module 3012 stores camera parameters of the imaging device 500, information on the target bottle which may be processed by the robot 100, a color threshold of the color classification of the bottle, a size threshold of the size classification of the bottle, etc. The information on the bottle may include information on the color, the surface texture, the contour shape, and the longitudinal direction of this contour shape of the bottle which may be processed. The memory module 3012 may store the image captured by the imaging device 500, the processed image of this image, and/or the program.

The camera parameters include external parameters and internal parameters. Examples of the external parameters are parameters indicative of the position (3D position) and the orientation (orientation of the optical axis center) of the imaging device 500. Examples of the internal parameters are parameters indicative of the distortion of the lens of the imaging device 500, the focal length, a pixel size of the image sensor, and pixel coordinates of the optical axis center. The pixel coordinates are pixel-based coordinates and are 2D coordinates on the image.

The contour shape of the bottle is a contour shape on the projected plane when the bottle is projected from various directions. The longitudinal direction of the contour shape of the bottle corresponds to the longitudinal axial direction passing through the spout and the bottom of this bottle, and indicates the orientation of this bottle. The contour shape of the bottle and its longitudinal direction are stored as a template.

The color threshold may be a threshold for a luminance value of the pixel. For example, the bottle may be classified as either transparent or colored according to whether the luminance value of the pixel indicative of the bottle is either above or below the color threshold. The number of color classifications is not limited to two, but may be three or more.

The size threshold includes an actual size threshold for a determination of the actual size of the bottle, and an image size threshold for a determination of the size of the bottle on the image. The size threshold may be a threshold for the length of the bottle in the longitudinal direction. For example, the bottle may be classified as either falling under the large size classification or the small size classification according to whether the length of the bottle in the longitudinal direction is either above or below the size threshold. Note that the number of size classifications is not limited to two, but may be three or more.

The imaging control module 3001 controls operation of the imaging device 500. For example, the imaging control module 3001 causes the imaging device 500 to image the conveyance surface 221 of the belt conveyor 200 at a given interval. The imaging control module 3001 outputs to the memory module 3012 the two images captured simultaneously by the imaging device 500 which is the stereoscopic camera so that the images are associated with each other.

The image processing module 3002 is one example of first to third image processing modules. The image processing module 3002 uses the two images captured simultaneously by the imaging device 500 to identify bottle images to be projected on the two images, respectively, and detects the 3D position, size, and posture of the bottle in this bottle image.

For example, the image processing module 3002 extracts an edge in each of the two images, and compares the extracted edge with the template of the contour shape of the bottle in the memory module 3012 by a pattern matching technique to detect the edge of the bottle. Further, the image processing module 3002 detects, at least in one of the two images, a color of the bottle image surrounded by the edge of the bottle, and classifies this bottle image into a transparent bottle image and a colored bottle image based on the color classification in the memory module 3012.

Moreover, the image processing module 3002 detects, in each of the two images, the 2D center of gravity position, the 2D longitudinal direction, and the 2D length in the longitudinal direction of each bottle image as the 2D center of gravity position, the 2D posture, and the 2D size. For example, the longitudinal direction of the bottle image may be a direction from the bottom of the bottle image toward the spout. Note that the image processing module 3002 may use the longitudinal direction of the contour shape indicated by the template corresponding to the bottle image as the longitudinal direction of this bottle image.

The image processing module 3002 processes the two images by the stereo matching technique using the camera parameters in the memory module 3012 etc. The image processing module 3002 detects, for the bottle corresponding to each bottle image (i.e., the actual bottle), the 3D center of gravity position, the 3D longitudinal direction, and the 3D length in the longitudinal direction within a 3D section where the robot system 1 exists, as the 3D center of gravity position, the 3D posture, and the 3D size, respectively. For example, the 3D center of gravity position, the 3D posture, and the 3D size of the bottle may be detected by carrying out image processing of pixels indicative of the 2D center of gravity position, the 2D posture, and the 2D size of the bottle image.

The image processing module 3002 outputs to the first index processing module 3003, for each transparent bottle image in at least one of the two images, ID which is identification information set to this transparent bottle image, the color classification of this transparent bottle image, the pixel coordinates indicative of the 2D center of gravity position and the 2D posture of this transparent bottle image, and the 3D center of gravity position, the 3D posture, and the 3D size of the transparent bottle corresponding to this transparent bottle image so as to be associated with each other. The image processing module 3002 outputs to the second index processing module 3004, for each colored bottle image in at least one of the two images, ID which is identification information set to this colored bottle image, the color classification of this colored bottle image, the pixel coordinates indicative of the 2D center of gravity position and the 2D posture of this colored bottle image, and the 3D center of gravity position, the 3D posture, and the 3D size of the colored bottle corresponding to this colored bottle image so as to be associated with each other.

The image processing module 3002 generates an image in which the edge of the bottle image is exaggerated by using one of the two images from which the edges of the bottle images are extracted. The image processing module 3002 uses an image in which the 2D center of gravity position and the 2D longitudinal direction of the bottle image to be outputted to the index processing modules 3003 and 3004 are detected. The image processing module 3002 generates, from one image, a first image where only the edge of the transparent bottle image is exaggerated, and a second image where only the edge of the colored bottle image is exaggerated. When the image includes only the transparent bottle image, the image processing module 3002 generates the second image, without exaggerating the edge. When the image includes only the colored bottle, the image processing module 3002 generates the first image, without exaggerating the edge. The image processing module 3002 outputs the first image to the first image synthesis module 3005, and outputs the second image to the second image synthesis module 3006. In this embodiment, the image processing module 3002 exaggerates the edge by thickening the edge. The method of exaggerating the edge is not limited in particular, but may be any kind of methods, such as changing the color of the edge into a distinguishing color, brightening the edge, and blinking the edge.

Figure 7:
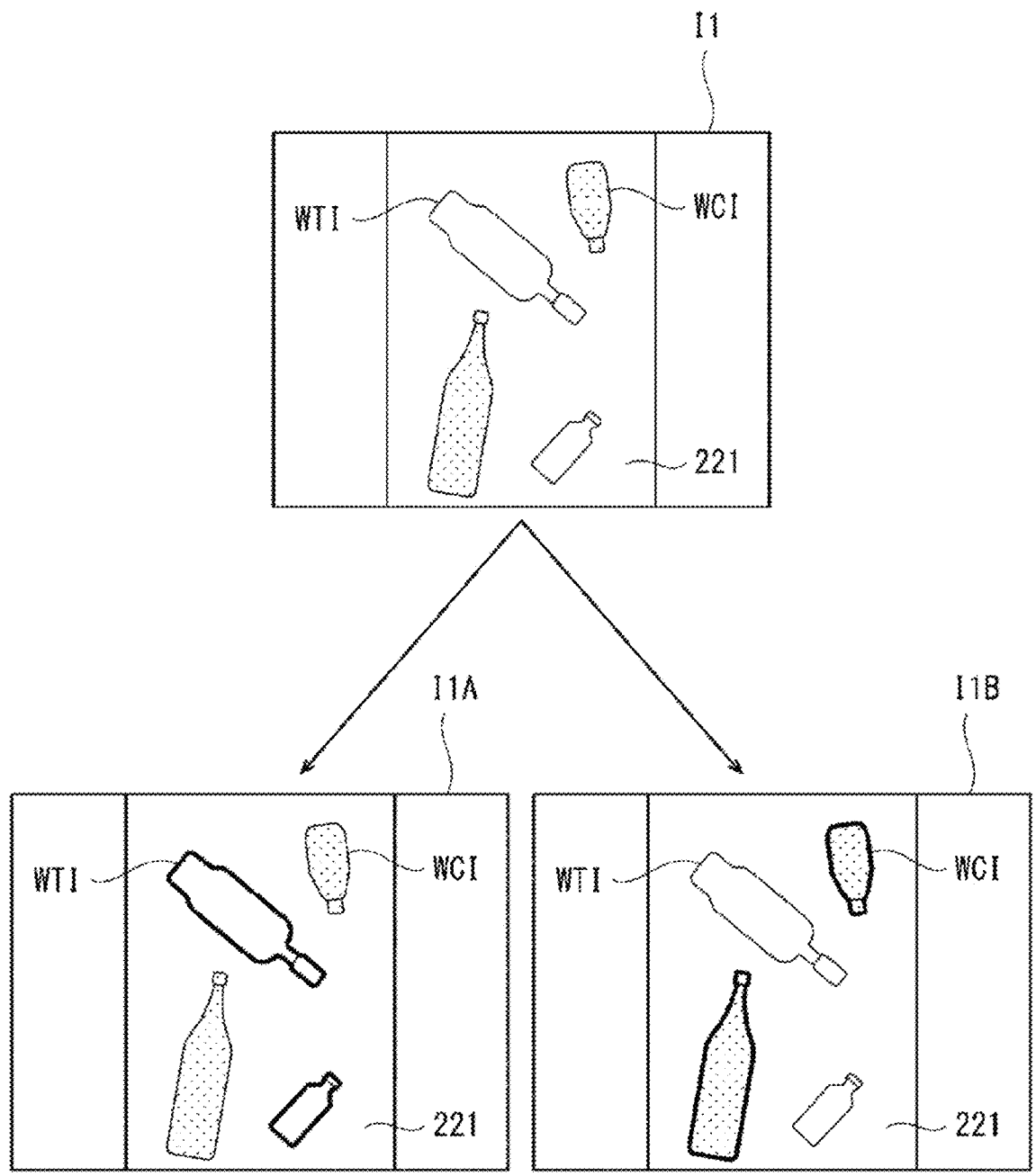
FIG. 7 is a view illustrating one example of an image which is image-processed by the information processing device according to this embodiment.

For example, FIG. 7 is a view illustrating one example of the image which is image-processed by the information processing device 300 according to this embodiment. As illustrated in FIG. 7, when a captured image I1 includes a transparent bottle image WTI and a colored bottle image WCI, only the edge of the transparent bottle image WTI is exaggerated in the first image I1A, and only the edge of the colored bottle image WCI is exaggerated in the second image I1B.

The first index processing module 3003 generates a bottle index for indicating information on this transparent bottle on the first image by using the 2D center of gravity position and the 2D posture of the transparent bottle image, and the 3D size of the transparent bottle corresponding to this transparent bottle image. The first index processing module 3003 classifies the 3D size of the transparent bottle into the large and small size classifications based on the actual size threshold in the memory module 3012. The first index processing module 3003 generates the image data of the bottle index including a position index, a posture index, and a size index. The position index indicates the 2D center of gravity position of the transparent bottle, the posture index indicates the 2D longitudinal direction of the transparent bottle, and the size index indicates the size classification of the transparent bottle.

Figure 8:
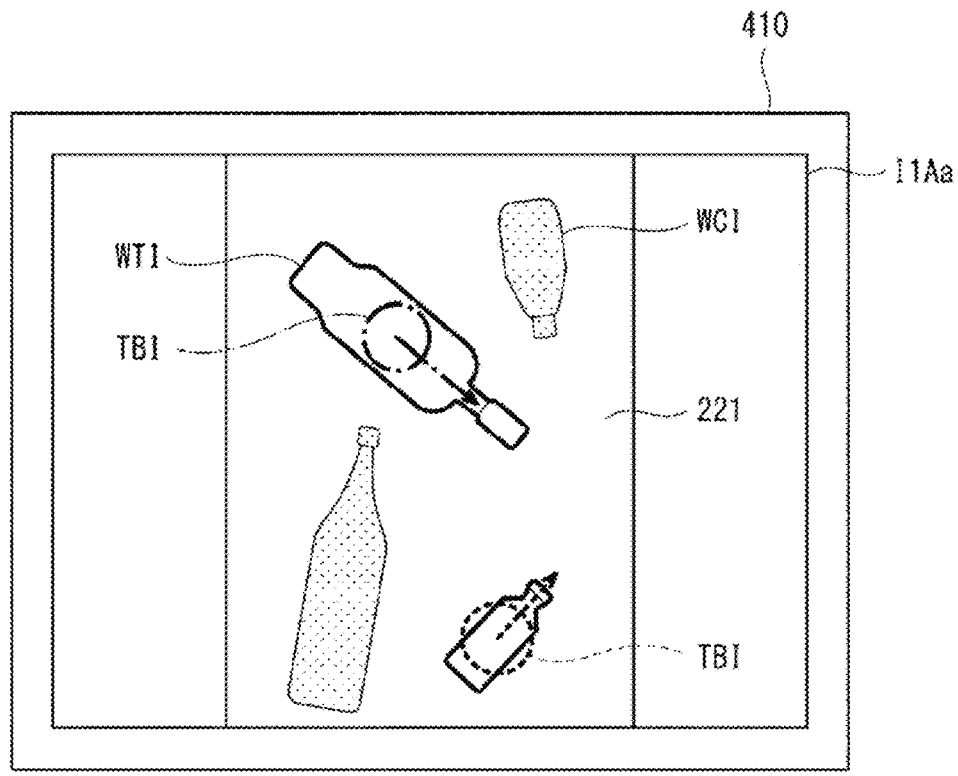
FIG. 8 is a view illustrating one example of a screen for a first superimposed image of bottle indexes generated by the information processing device according to this embodiment.

FIG. 8 is a view illustrating one example of a screen for a first superimposed image of the bottle index generated by the information processing device 300 according to this embodiment. As illustrated in FIG. 8, in this embodiment, a position index of a bottle index TBI generated by the first index processing module 3003 is indicated by a circle of which the center of gravity position of the bottle image is the center. The posture index is indicated by a direction of an arrow extending from the center of the circle of the position index as a starting point. The size index is indicated by a difference in the displaying mode of the bottle index TBI. For example, when the bottle belongs to the large size classification, the bottle index TBI is displayed by a one-dot chain line, and when the bottle belongs to the small size classification, the bottle index TBI is displayed by a broken line. The difference in the displaying mode of the bottle index is not limited to the difference in the line type, but may be a difference in color, brightness, and blinking. Further, the size index may be indicated by a difference in the length of the arrow of the posture index.

The first index processing module 3003 outputs to the first image synthesis module 3005 the ID of the transparent bottle image and the image data of the bottle index of the transparent bottle corresponding to this transparent bottle image so as to be associated with each other. The image data of the bottle index includes the image of the bottle index, and the information on the position, the posture, and the size of this bottle index on the first image or the second image. Further, the first index processing module 3003 outputs to the robot control device 600 the ID of the transparent bottle image, the 3D center of gravity position, the 3D posture, the size classification, and the color classification of the transparent bottle corresponding to the bottle index so as to be associated with each other.

The second index processing module 3004 generates, similar to the first index processing module 3003, a bottle index for indicating the information on the colored bottle on the second image by using the 2D center of gravity position and the 2D posture of the colored bottle image, and the 3D size of the colored bottle corresponding to this colored bottle image. The second index processing module 3004 outputs to the second image synthesis module 3006 the ID of the colored bottle image and the image data of the bottle index of the colored bottle corresponding to this colored bottle image so as to be associated with each other. Further, the second index processing module 3004 outputs to the robot control device 600 the ID of the colored bottle image, and the 3D center of gravity position, the 3D posture, the size classification, and the color classification of the colored bottle corresponding to the bottle index so as to be associated with each other.

Moreover, the index processing modules 3003 and 3004 each performs processing for correcting and deleting the bottle index displayed on the touchscreen 410, and processing for adding the bottle index, based on the input information into the I/O devices 400A and 400B, respectively.

The first image synthesis module 3005 synthesizes the first image with the image of the bottle index of the transparent bottle by using the first image and the image data of the bottle index of the transparent bottle. The first image synthesis module 3005 displays the image of this bottle index so as to be superimposed on the first image according to the information on the position, the posture, and the size of this bottle index included in the image data. For example, the first image synthesis module 3005 generates a first superimposed image I1 Aa as illustrated in FIG. 8, and outputs it to the I/O device 400A to display it on the touchscreen 410. The bottle index is displayed so as to be superimposed on the bottle image corresponding to this bottle index.

Figure 9:
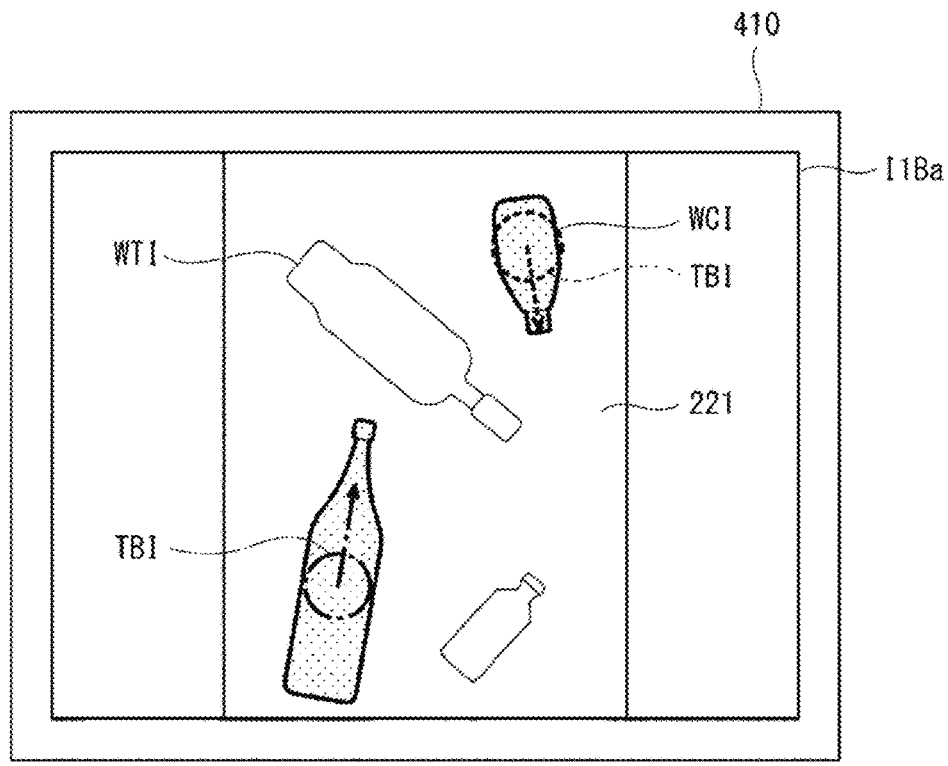
FIG. 9 is a view illustrating one example of a screen for a second superimposed image of the bottle indexes generated by the information processing device according to this embodiment.

Similar to the first image synthesis module 3005, the second image synthesis module 3006 generates the image where the bottle index of the colored bottle is displayed so as to be superimposed on the second image by using the second image, the image data of the bottle index of the colored bottle, and the information on the position, the posture, and the size of this bottle index on the image. For example, the second image synthesis module 3006 generates a second superimposed image I1Ba as illustrated in FIG. 9, and outputs it to the I/O device 400B to display it on the touchscreen 410. FIG. 9 is a view illustrating one example of the screen for the second superimposed image of the bottle index generated by the information processing device 300 according to this embodiment.

The input analysis modules 3007 and 3008 illustrated in FIG. 6 are one example of a position detecting module, a size detecting module, and a posture detecting module. The first input analysis module 3007 receives and analyzes inputted information inputted into the touchscreen 410 of the I/O device 400A. The second input analysis module 3008 receives and analyzes inputted information inputted into the touchscreen 410 of the I/O device 400B. For example, the input analysis modules 3007 and 3008 analyze the input information to detect a correction command and a deletion command to the displayed bottle index, an addition command of the bottle index, and the contents of each command. The first input analysis module 3007 outputs the detection result to the first index processing module 3003 and the first converter module 3009. The second input analysis module 3008 outputs the detection result to the second index processing module 3004 and the second converter module 3010.

When the correction command of the position of the circle which is the position index of the bottle index on the touchscreen 410 is detected, the input analysis modules 3007 and 3008 detect the correction position of the circle commanded on the screen, and detect the pixel coordinates of the center of the circle at this correction position as a commanded position. When the correction command of the direction of the arrow which is the posture index on the touchscreen 410 is detected, the input analysis modules 3007 and 3008 detect a correcting direction of the arrow commanded on the screen, and detect the pixel coordinates indicative of the direction of the arrow in this correcting direction (for example, a vector component of the arrow) as a commanded posture. For example, the commanded posture may indicate a direction corresponding to a locus formed by the command made on the screen. When the correction command of the size index is detected on the touchscreen 410, the input analysis modules 3007 and 3008 detect a commanded size commanded on the screen, and detect the size classification corresponding to the commanded size (hereinafter, may also be referred to as "the commanded size classification"). For example, the commanded size may be a size corresponding to the locus formed by the command made on the screen. The input analysis modules 3007 and 3008 determine the commanded size classification based on the comparison result of the commanded size with the image size threshold. If the commanded size is above the image size threshold, the input analysis modules 3007 and 3008 determine the commanded size classification as the large size classification, and if it is below the image size threshold, they determine the commanded size classification as the small size classification.

The first input analysis module 3007 outputs to the first index processing module 3003 and the first converter module 3009 the ID of the bottle index, and a group of the commanded position, the commanded posture, and the commanded size classification to this bottle index so as to be associated with each other. The ID of the bottle index is an ID of the bottle image corresponding to the bottle index. Similarly, the second input analysis module 3008 also outputs to the second index processing module 3004 and the second converter module 3010 the ID of the bottle index, and the group of the commanded position, the commanded posture, and the commanded size classification to this bottle index so as to be associated with each other. The index processing modules 3003 and 3004 correct the bottle index by correcting the position index, the posture index, and the size index based on the information described above received from the input analysis modules 3007 and 3008, and output the ID of the corrected bottle index and the image data to the image synthesis modules 3005 and 3006 to display on the touchscreen 410 so that the bottle index before the correction is replaced by the bottle index after the correction, respectively.

Figure 10:
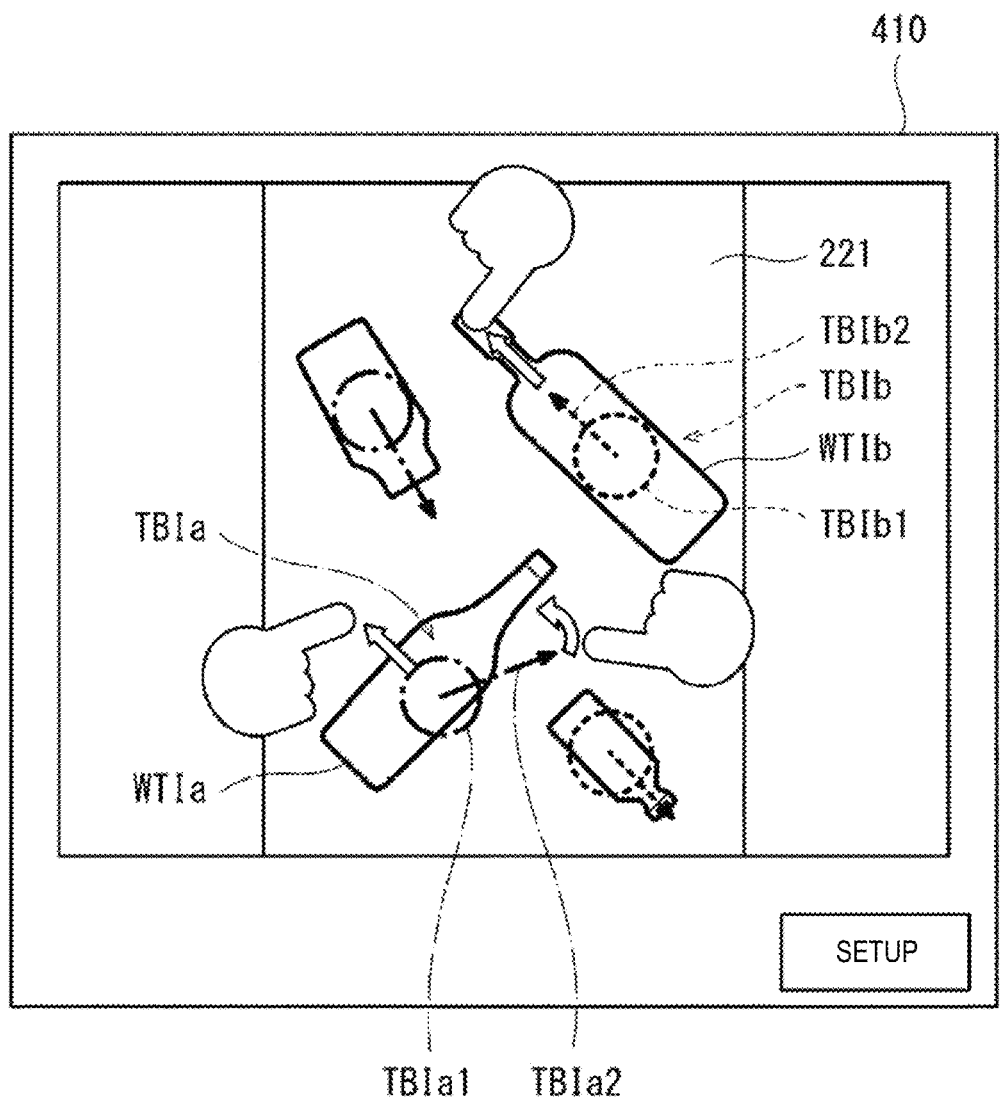
FIG. 10 is a view illustrating one example of a screen for the first superimposed image which displays bottle indexes to be corrected by the information processing device according to this embodiment.
Figure 11:
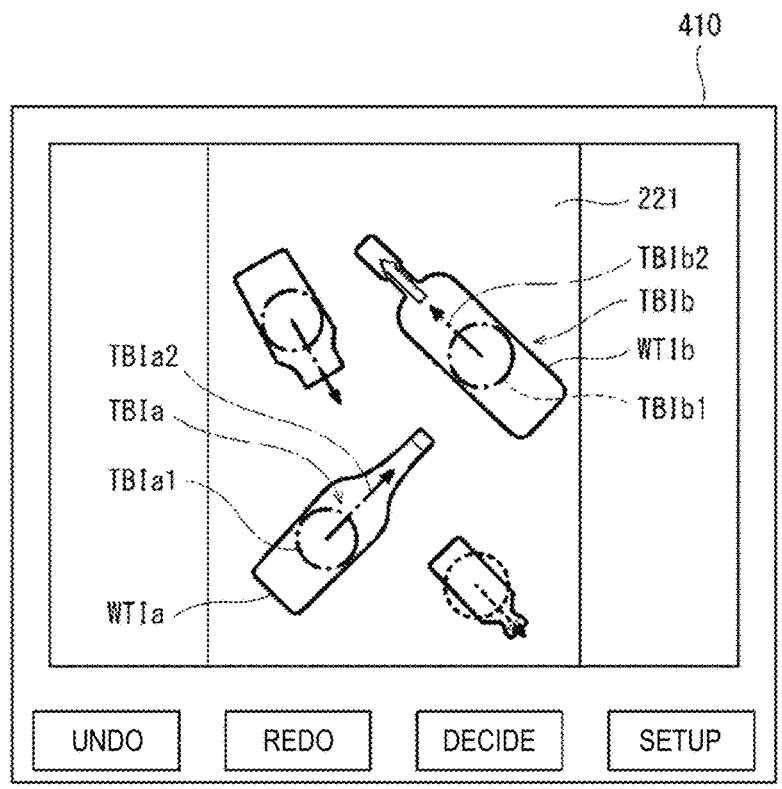
FIG. 11 is a view illustrating one example of a screen for the first superimposed image which displays the bottle indexes corrected by the information processing device according to this embodiment.

For example, FIG. 10 is a view illustrating one example of a screen for the first superimposed image which displays the bottle index corrected by the information processing device 300 according to this embodiment. FIG. 11 is a view illustrating one example of the screen for the first superimposed image which displays the corrected bottle index by the information processing device 300 according to this embodiment. As illustrated in FIG. 10, for example, when the position index of a bottle index TBIa of a transparent bottle image WTIa on the touchscreen 410 is corrected, the circumference of a circle TBIa1 of the bottle index TBIa is selected by a tap of the operator's finger and the tapped location is slid, and the circle TBIa1 is then moved in a direction corresponding to the sliding direction of the tapped location by a moving amount corresponding to the sliding amount. When the finger is separated from the touchscreen 410, the movement of the circle TBIa1 stops. In the process described above, the first input analysis module 3007 detects the tap on the circumference of the circle TBIa1 as the correction command of the position index, and detects the pixel coordinates of the center of the circle TBIa1 which moves corresponding to the sliding direction and the sliding amount of the tapped location as the commanded position. The commanded position is a position corresponding to the locus formed by the tapped location. As illustrated in FIG. 11, the first index processing module 3003 generates the image data of the circle TBIa1 which moves along with the center, and displays it on the touchscreen 410.

Moreover, as illustrated in FIG. 10, for example, when correcting the posture index of the bottle index TBIa, an arrow TBIa2 of the bottle index TBIa is selected by a tap of the finger, the tapped location is slid in a direction which intersects with the arrow TBIa2, and the arrow TBIa2 is then rotated centering on the center of the circle TBIa1 in a direction corresponding to the finger sliding direction and by an amount corresponding to the finger sliding amount so that the arrow in changed in the direction. When the finger is separated from the touchscreen 410, the rotation of the arrow TBIa2 stops. In the process described above, the first input analysis module 3007 detects the tap on the arrow TBIa2 as the correction command of the posture index, and detects the pixel coordinates of a vector of the arrow TBIa2 which rotates corresponding to the sliding direction and the sliding amount of the tapped location as the commanded posture. The commanded posture is a direction corresponding to the locus formed by the tapped location. As illustrated in FIG. 11, the first index processing module 3003 generates the image data of the arrow TBIa2 which rotates along with the vector, and displays it on the touchscreen 410.

Further, as illustrated in FIG. 10, for example, when correcting the size index of a bottle index TBIb of a transparent bottle image WTIb, an arrow TBIb2 of the bottle index TBIb is selected by a tap of the finger, and the tapped location is slid to the axial direction of the arrow TBIb2. Therefore, the arrow TBIb2 is extended or contracted in the sliding direction by a distance corresponding to the sliding amount of the tapped location so that its length is changed. When the finger is separated from the touchscreen 410, the length of the arrow TBIa2 is returned to the length before the extension or contraction.

In the process described above, the first input analysis module 3007 detects the tap on the arrow TBIa2 as the correction command of the size index, and detects the distance from the center of a circle TBIb1 to the tapped location in the direction of the arrow TBIb2 as the commanded size. The commanded size is a size corresponding to the locus formed by the tapped location. Further, the first input analysis module 3007 compares the distance described above with the image size threshold to determine the commanded size classification. The first index processing module 3003 generates the image data of the bottle index TBIb in which the arrow TBIa2 is extended and contracted according to the distance described above and the line type of the bottle index is changed corresponding to the commanded size classification, and displays it on the touchscreen 410. Although in FIG. 10 the bottle index TBIb is expressed by the broken line indicative of the small size classification which is erroneously detected, the bottle index TBIb is expressed by the one-dot chain line indicative of the large size classification in FIG. 11 after the correction of the size index. Since the line type of the bottle index is changed according to the change in the size classification during the movement of the finger, the user can confirm the size classification during the corrective action of the size index.

Further, when a button "decide" displayed on the touchscreen 410 as illustrated in FIG. 11 is selected by a tap of the finger, the first index processing module 3003 determines, for the bottle index which received a change in the latest timing from the present time, the change which this bottle index received. The change described above includes the correction, deletion, and addition of the bottle index. The first input analysis module 3007 outputs to the first converter module 3009 the position index, the posture index, and the size index of the bottle index for which the change is determined, along with the ID. When a button "undo" displayed on the touchscreen 410 is selected, the first index processing module 3003 resumes, for the bottle index which received the change in the latest timing from the present time, a state before the change which is an undo state where the change which this bottle index received is canceled. Further, when a button "redo" displayed on the touchscreen 410 is selected, the first index processing module 3003 resumes, for the bottle index that is returned to the unchanged state by the selection of the button "undo," the canceled change to resume the changed state. The second index processing module 3004 also operates according to the selection of the button, similar to the first index processing module 3003.

When the deletion command of the bottle index is detected on the touchscreen 410 of the I/O device 400A, the first input analysis module 3007 outputs the ID of this bottle index and the deletion command of this bottle index to the first index processing module 3003 and the first converter module 3009. When the deletion command of the bottle index is detected on the touchscreen 410 of the I/O device 400B, the second input analysis module 3008 outputs the ID of this bottle index and the deletion command of this bottle index to the second index processing module 3004 and the second converter module 3010. The index processing modules 3003 and 3004 output the corresponding bottle index ID and the deletion command of the image to the image synthesis modules 3005 and 3006, respectively, to delete the screen indication of this bottle index.

Figure 12:
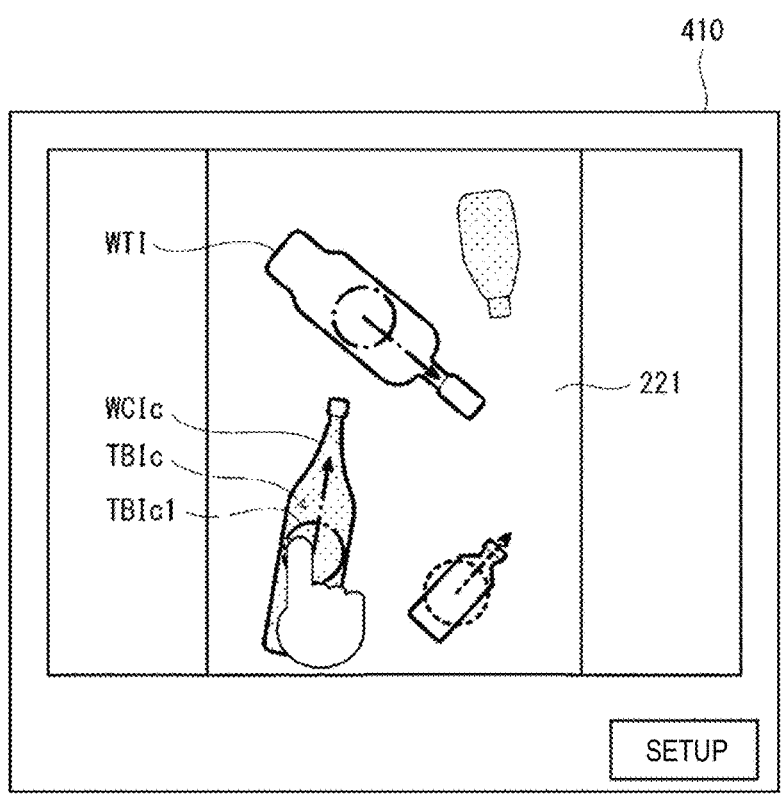
FIG. 12 is a view illustrating one example of a screen for the first superimposed image which displays bottle indexes to be deleted by the information processing device according to this embodiment.
Figure 13:
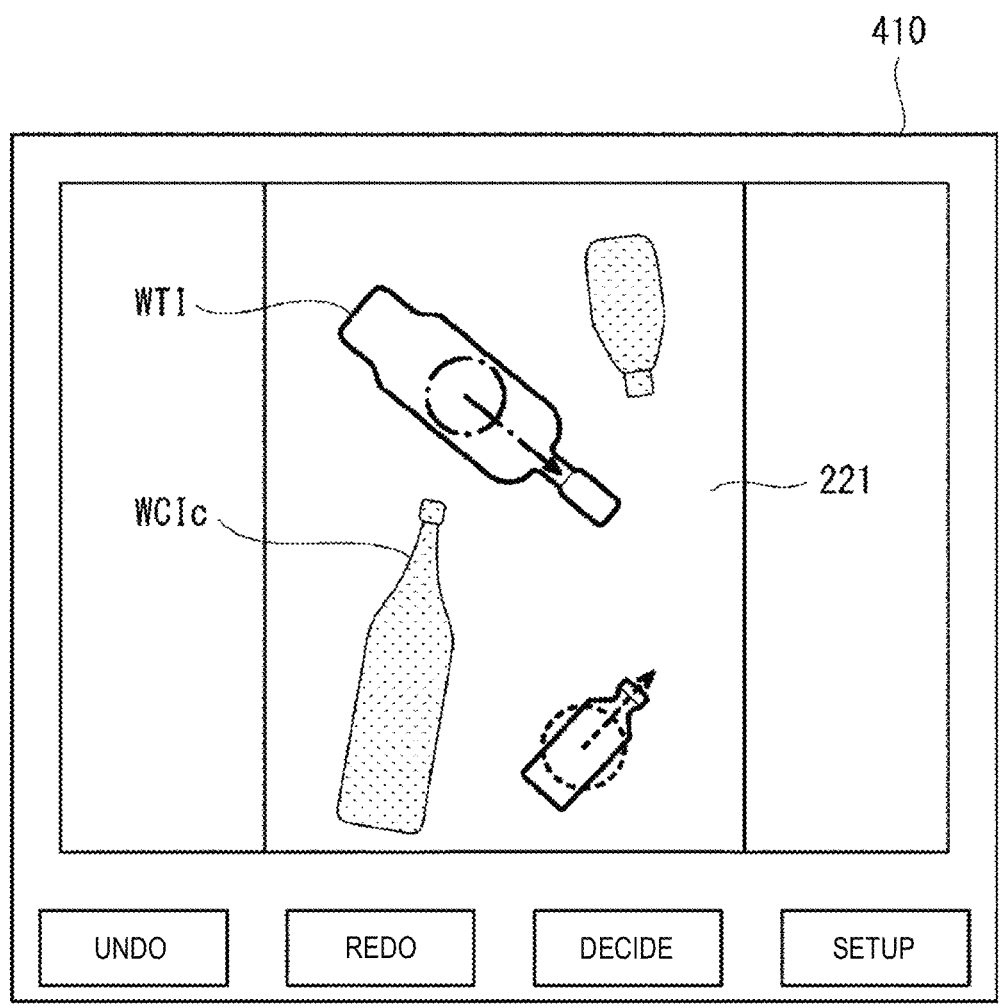
FIG. 13 is a view illustrating one example of a screen for the first superimposed image after the deletion of the bottle indexes by the information processing device according to this embodiment.

FIG. 12 is a view illustrating one example of the screen for the first superimposed image which displays the bottle index to be deleted by the information processing device 300 according to this embodiment. FIG. 13 is a view illustrating one example of the screen for the first superimposed image after the deletion of the bottle index by the information processing device 300 according to this embodiment. In FIG. 12, a bottle index TBIc of a colored bottle image WCIc is erroneously displayed on the touchscreen 410, and it is a candidate for a deletion. Then, when an internal area of the circumference of a circle TBIc1 of the bottle index TBIc is selected by a tap of the finger, the bottle index TBIc is deleted. In the process described above, the first input analysis module 3007 detects the tap on the internal area of the circumference of the circle TBIc1 as a deletion command of the bottle index TBIc, and, as illustrated in FIG. 13, the first index processing module 3003 deletes the image of the bottle index TBIc from the touchscreen 410.

When an addition command of the position index of the bottle index is detected on the touchscreen 410, the input analysis modules 3007 and 3008 detect the pixel coordinates at the commanded position on the screen as the commanded position. When an addition command of the posture index is detected on the touchscreen 410, the input analysis modules 3007 and 3008 detect the pixel coordinates indicative of the commanded direction on the screen as the commanded posture. When an addition command of the size index is detected on the touchscreen 410, the input analysis modules 3007 and 3008 detect the size commanded on the screen as the commanded size. Further, when the commanded size is above the image size threshold, the input analysis modules 3007 and 3008 determine the commanded size classification as the large size classification, and when it is below the image size threshold, they determine the commanded size classification as the small size classification.

The input analysis modules 3007 and 3008 output to the first index processing module 3003 and the first converter module 3009, and the second index processing module 3004 and the second converter module 3010, respectively, the ID of a new bottle index, and the group of the commanded position, the commanded posture, and the commanded size classification for this bottle index so as to be associated with each other. The index processing modules 3003 and 3004 generate a new bottle index including a new position index, a new posture index, and a new size index based on the above information received from the input analysis modules 3007 and 3008, and output the ID and the image data of this new bottle index to the image synthesis modules 3005 and 3006 to display them on the touchscreen 410, respectively.

Figure 14:
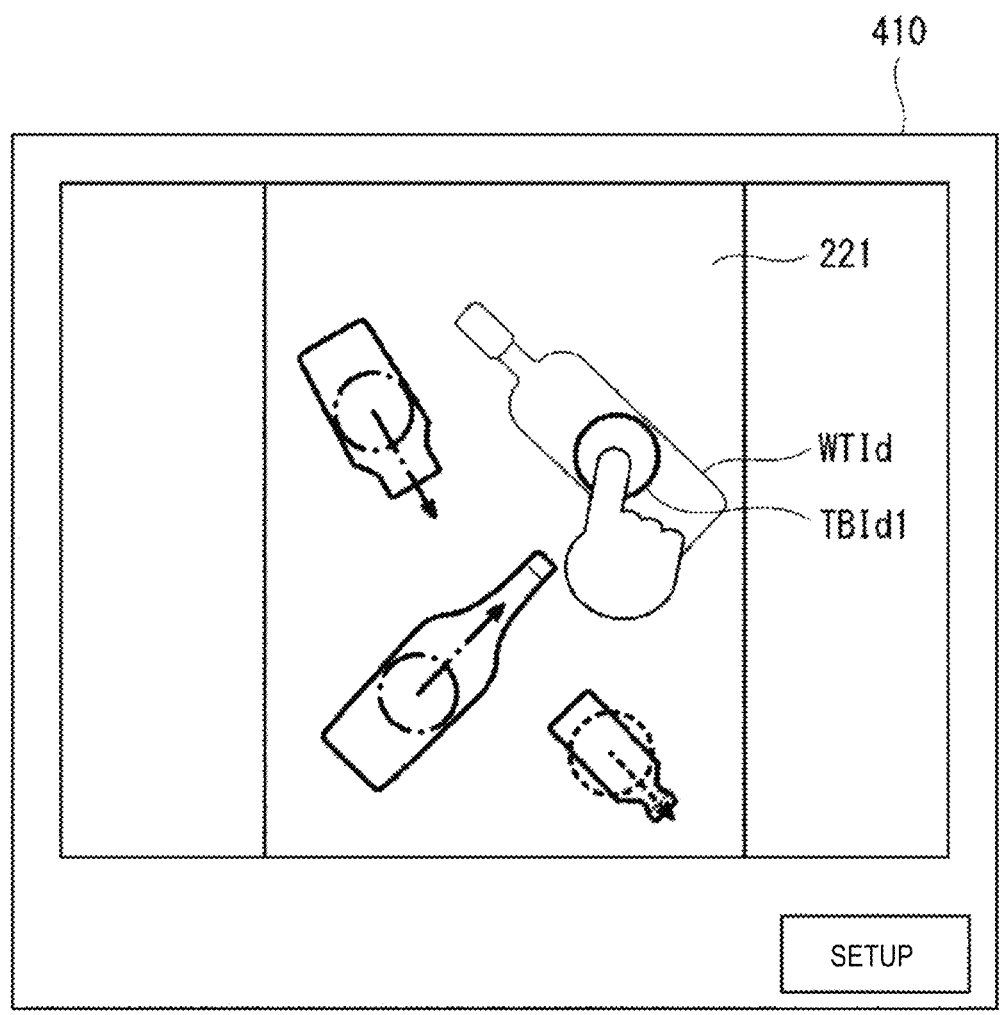
FIG. 14 is a view illustrating one example of a screen for the first superimposed image which displays a state where the bottle index is added by the information processing device according to this embodiment.
Figure 15:
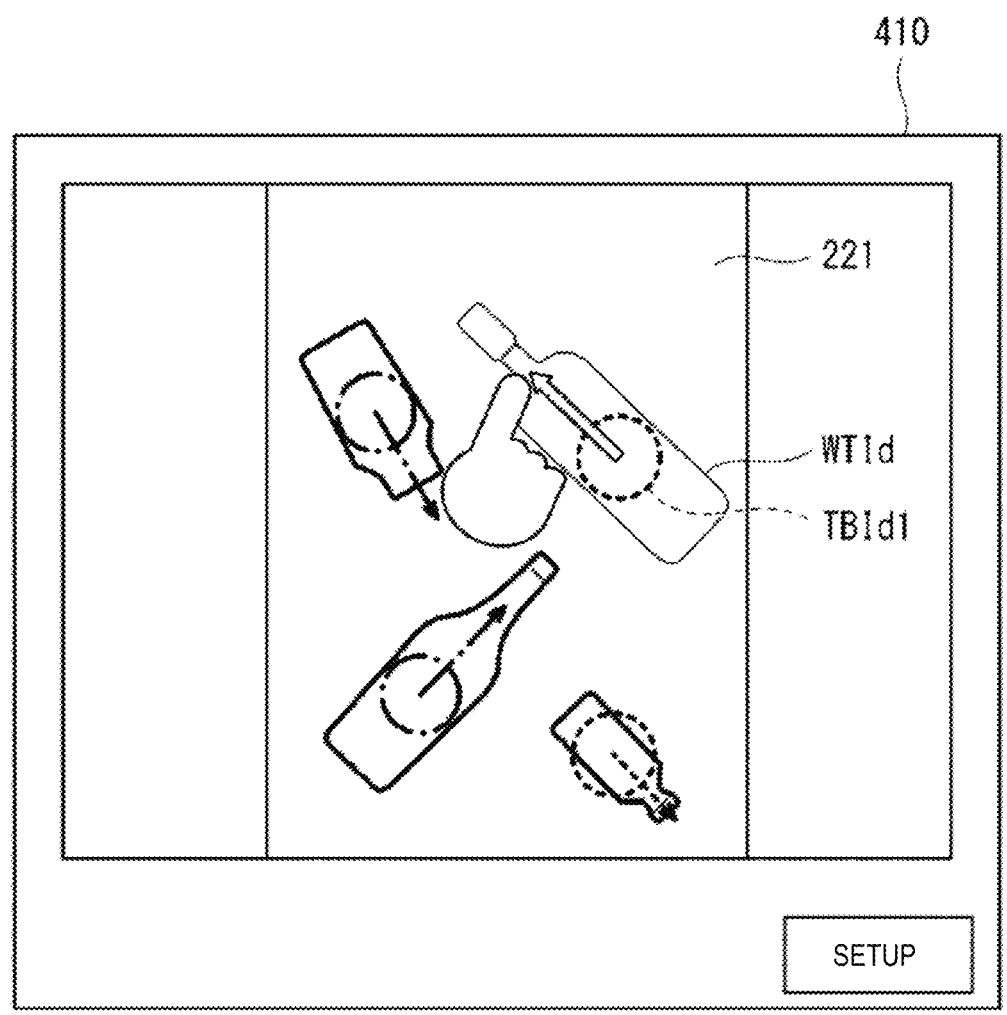
FIG. 15 is a view illustrating one example of a screen for the first superimposed image which displays a state where the bottle index is added by the information processing device according to this embodiment.
Figure 16:
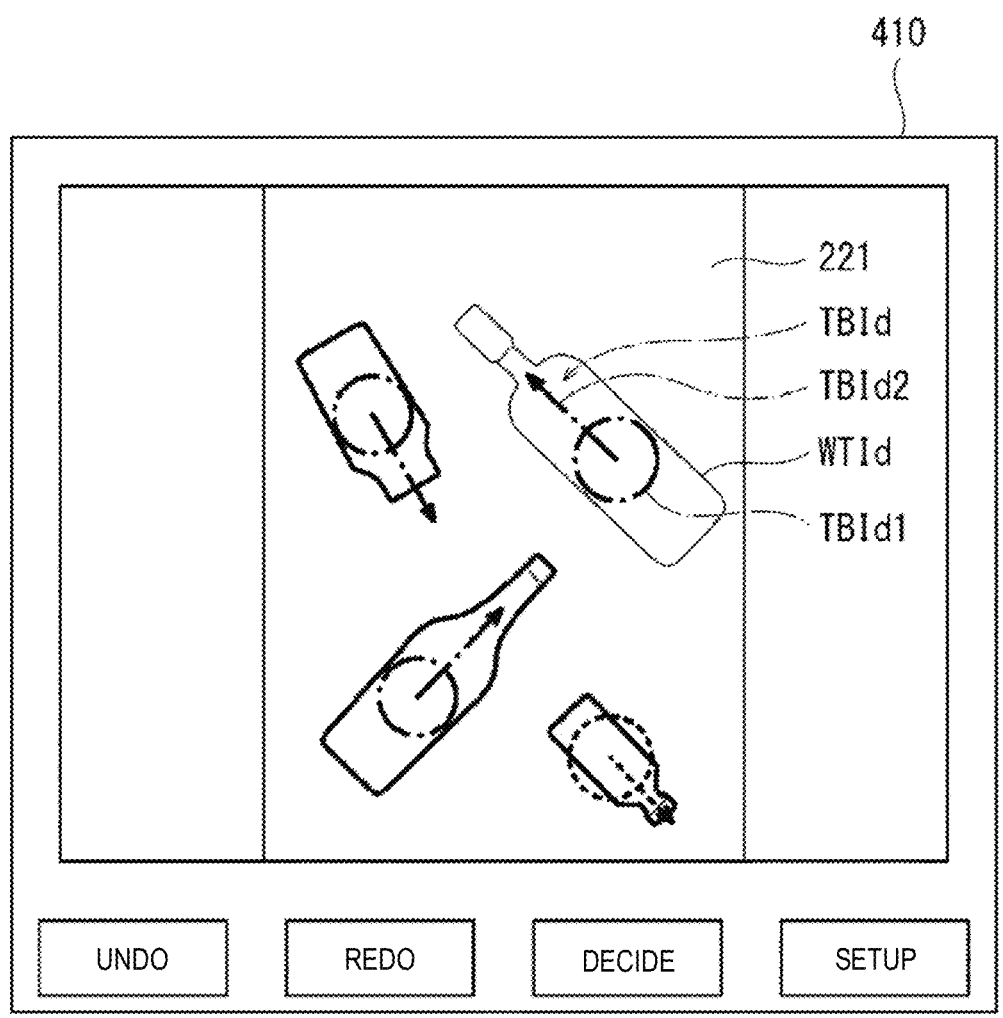
FIG. 16 is a view illustrating one example of a screen for the first superimposed image after the addition of the bottle index by the information processing device according to this embodiment.

FIGS. 14 and 15 are views illustrating one example of a screen for the first superimposed image which displays a state where the bottle index is added by the information processing device 300 according to this embodiment. FIG. 16 is a view illustrating one example of the screen for the first superimposed image after the addition of the bottle index by the information processing device 300 according to this embodiment. In FIG. 14, the bottle index is not displayed erroneously on a transparent bottle image WTId, and therefore, the transparent bottle image WTId is an addition target of the bottle index. Then, a commanded position of a new position index of a new bottle index TBId is specified on the image of a transparent bottle WTId by a tap of the finger, and a circle TBId1 of the new position index is displayed centering on the commanded position. Next, by separating the tapped finger from the touchscreen 410 after the finger is slid as illustrated in FIG. 15, an arrow TBId2 indicative of a new posture index is displayed in a direction corresponding to the sliding direction of the tapped location as illustrated in FIG. 16. Further, the new bottle index TBId is expressed by a one-dot chain line which is a line type indicative of the size index of the size classification corresponding to the sliding amount of the tapped location.

In the process described above, the first input analysis module 3007 detects a tap at the position where the bottle index does not exist as the addition command of the new position index and detects the image coordinates of the tapped location as the commanded position, and the first index processing module 3003 uses the pixel coordinates at the commanded position as the pixel coordinates of the new position index. The first input analysis module 3007 detects the movement of the tapped location from the commanded position as the addition command of the new posture index and the new size index. The first input analysis module 3007 detects the pixel coordinates indicative of the sliding direction of the tapped location based on the locus of the tapped location as the commanded posture, and the first index processing module 3003 uses the pixel coordinates of the commanded posture as the pixel coordinates of the new posture index. The first input analysis module 3007 detects the distance from the commanded position in the sliding direction described above to the tapped location as the commanded size, and determines the commanded size classification by comparing the commanded size with the image size threshold. The first index processing module 3003 uses the commanded size classification as the size classification indicated by the new size index. Further, as illustrated in FIG. 16, the first index processing module 3003 generates the image data of the new bottle index TBId based on the new position index, the new posture index, and the new size index, and displays it on the touchscreen 410.

Although in the above the contents of processing of the first input analysis module 3007 based on the input information to the touchscreen 410 of the I/O device 400A are illustrated, the second input analysis module 3008 also performs similar processing to the first input analysis module 3007 based on the input information to the touchscreen 410 of the I/O device 400B.

The converter modules 3009 and 3010 are examples of a positional information detecting module, a size information detecting module, a posture information detecting module, and an output module. The converter modules 3009 and 3010 convert information received from the input analysis modules 3007 and 3008, respectively, to detect object information which is information on the bottle, and output this object information to the robot control device 600. In detail, the converter modules 3009 and 3010 convert the commanded position, the commanded posture, and the commanded size classification for the bottle index to be corrected, deleted, or added, to detect the 3D center of gravity position, the 3D posture, and the size classification of the bottle corresponding to the bottle index. Although in this embodiment the commanded size classification and the size classification of the bottle have the same configuration, they may differ from each other and may be associated with each other. The detection described above is possible by a calculation similar to the calculation by the image processing module 3002 for detecting the 3D position, the 3D size, and the 3D posture of the bottle of the bottle image from the image. The converter modules 3009 and 3010 output to the robot control device 600 the object information which includes the 3D center of gravity position, the 3D posture, the size classification, and the color classification of the bottle corresponding to the bottle index corrected, deleted or added, and the ID of this bottle so as to be associated with each other. The robot control device 600 recognizes the bottle by using the received object information, and controls the robots 100A and 100B.

Figure 17:
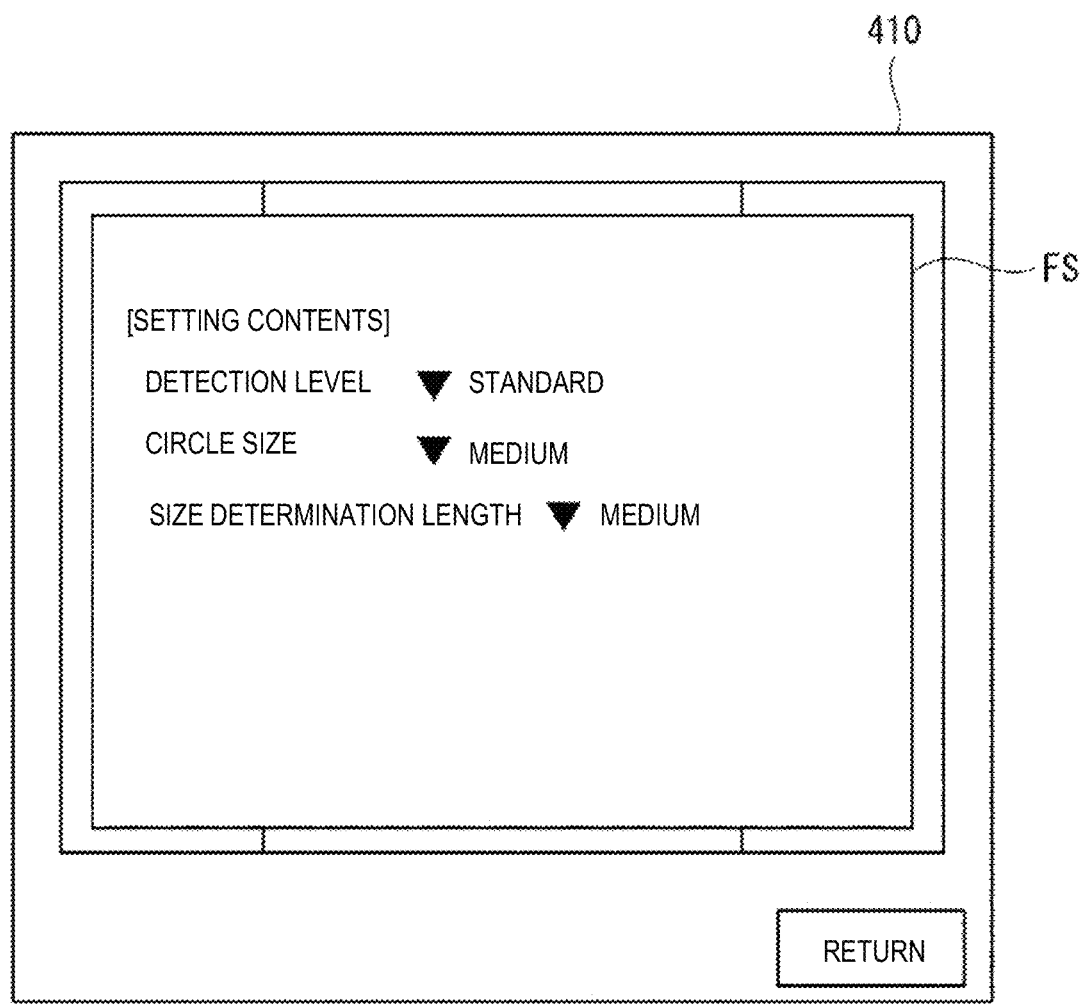
FIG. 17 is a view illustrating one example of a screen for setting up functions of the information processing device according to this embodiment.

The function setup module 3011 sets up the function of the information processing device 300 according to the command received from the I/O devices 400A and 400B. FIG. 17 is a view illustrating one example of a screen for setting up the function of the information processing device 300 according to this embodiment. For example, when the button "setup" displayed on the touchscreen 410 as illustrated in FIG. 16 is selected by a tap of the finger, the function setup module 3011 displays a function setup screen FS as illustrated in FIG. 17 on the touchscreen 410, and accepts function settings of the information processing device 300. The function setup screen FS displays at least one setup item, and, in this embodiment, it displays the setup items of a "detection level," a "circle size," and a "size determination length." Further, when a button "return" displayed on the touchscreen 410 is selected, the function setup module 3011 closes the function setup screen FS.

The "detection level" is an item for setting the recognition accuracy of the bottle in the image captured by the imaging device 500, and, for example, it enables the setting of three accuracy levels comprised of "high accuracy," "standard," and "low accuracy." The recognition accuracy of the bottle may include the recognition accuracy of the bottle itself, and may also include recognition accuracies, such as the color, shape, size, and position of the bottle. The "circle size" is an item for setting the indication size of the "circle" indicative of the position index of the bottle index on the touchscreen 410, and enables a setup of three size levels, "large," "medium," and "small." The "size determination length" is an item for setting the actual size threshold and the image size threshold for the size classification of the bottle, and enables a setup of three length levels, "long," "medium," and "short."

When an inverted triangle mark displayed beside the level of each item is selected, the function setup module 3011 displays a settable level for the item. The function setup module 3011 determines the level selected from the displayed levels as the level of this item, and notifies it to each functional component of the information processing device 300. For example, the function setup module 3011 notifies the determined "detection level" to the image processing module 3002. The function setup module 3011 notifies the determined "circle size" to the index processing modules 3003 and 3004. The function setup module 3011 notifies the determined "size determination length" to the input analysis modules 3007 and 3008 and the index processing modules 3003 and 3004.

<Operation of Robot System>

Figure 18:
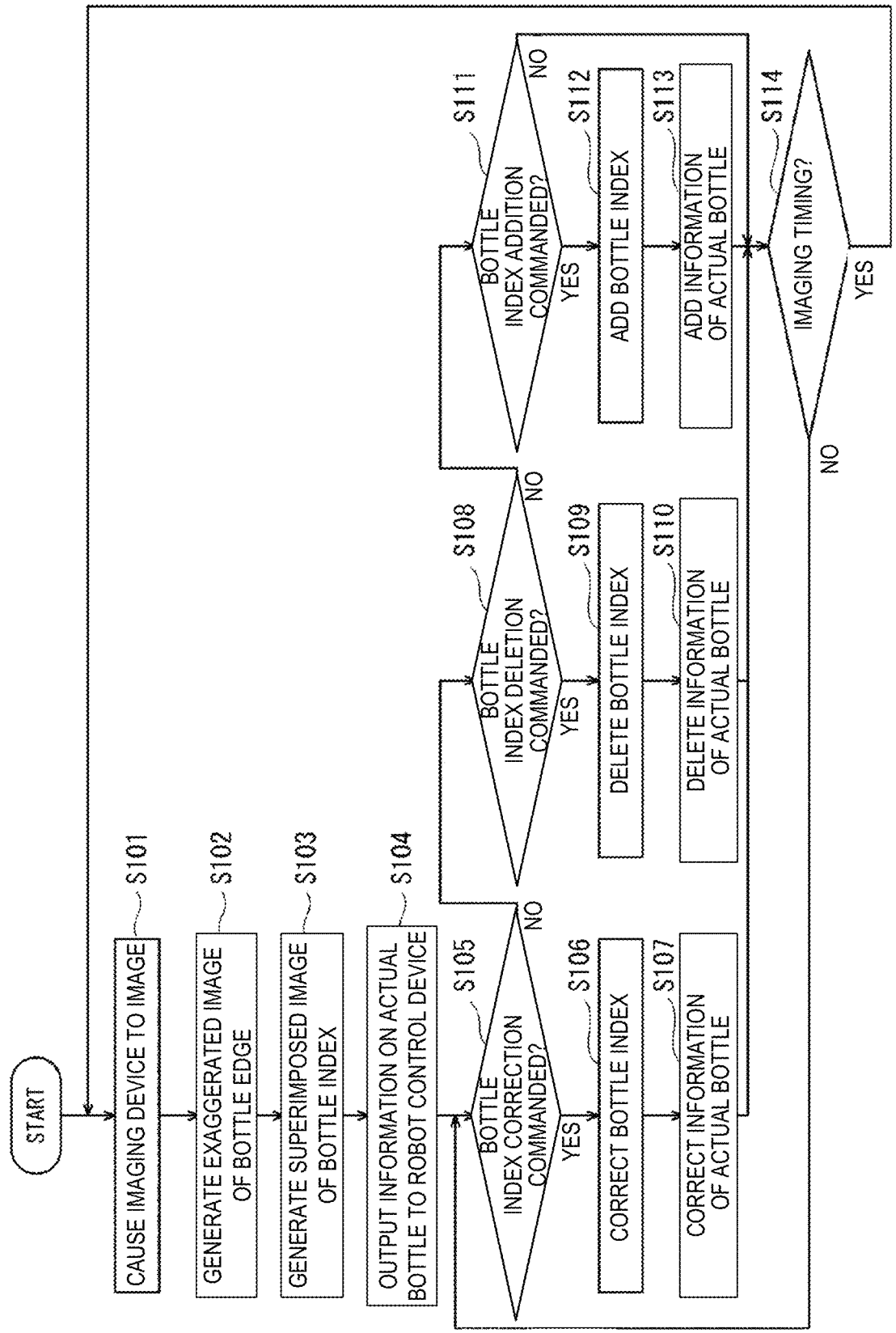
FIG. 18 is a flowchart illustrating one example of operation of the robot system according to this embodiment.

Operation of the robot system 1 according to this embodiment is described. In detail, operation of the robot system 1 which causes the robot control device 600 to recognize a bottle on the belt conveyor 200 is described. FIG. 18 is a flowchart illustrating one example of the operation of the robot system 1 according to this embodiment.

As illustrated in FIG. 18, at Step S101, the information processing device 300 causes the imaging device 500 to image the conveyance surface 221 of the belt conveyor 200 at the given interval, and receives the captured image data.

Next, at Step S102, the information processing device 300 carries out image processing of the image data to generate the first image in which the edge of the transparent bottle image is exaggerated, and the second image in which the edge of the colored bottle image is exaggerated.

Next, at Step S103, the information processing device 300 detects the position indexes, the posture indexes, and the size indexes of the transparent bottle image on the first image and the colored bottle image on the second image, and generates the bottle indexes. The information processing device 300 generates the first superimposed image which superimposedly indicates the bottle index of the transparent bottle image on the bottle image of the first image, and displays it on the I/O device 400A. The information processing device 300 generates the second superimposed image which superimposedly indicates the bottle index of the colored bottle image on the bottle image of the second image, and displays it on the I/O device 400B. In this embodiment, although the first superimposed image and the second superimposed image are, but not limited to, still images, they may be videos.

Next, at Step S104, the information processing device 300 outputs to the robot control device 600 the information on the actual transparent bottle and the information on the actual colored bottle corresponding to the bottle index of the transparent bottle image and the bottle index of the colored bottle image, respectively. The information on the bottle includes the ID, the 3D center of gravity position, the 3D posture, the size classification, and the color classification of the bottle. The robot control device 600 recognizes each bottle based on the information on the actual transparent bottle and the colored bottle.

The steps at and after the following Step S105, although the information processing device 300 performs processing corresponding to the input information to the I/O device 400A and processing corresponding to the input information to the I/O device 400B, since both are similar processings, only the processing corresponding to the input information to the I/O device 400A is described.

At Step S105, the information processing device 300 determines whether it detects the input for correcting the bottle index (i.e., the correction command), and if detected (Yes at Step S105), it transits to Step S106, and if not detected (No at Step S105), it transits to Step S108.

At Step S106, the information processing device 300 corrects the position index, the posture index, and/or the size index of this bottle index according to the contents of the correction command of the bottle index, and displays the corrected bottle index on the I/O device 400A. For example, as illustrated in FIG. 10, the correction of the position index is made by moving the circle indicative of the position index. The correction of the posture index is made by rotating the arrow indicative of the posture index. The correction of the size index is made by extending and contracting the arrow.

Next, at Step S107, the information processing device 300 corrects the information on the actual bottle which includes the ID, the 3D center of gravity position, the 3D posture, the size classification, and the color classification of the bottle corresponding to the corrected bottle index, and outputs it to the robot control device 600. In the information on the bottles to be processed by the robot 100A, the robot control device 600 corrects the information on the bottle corresponding to the corrected bottle index, and recognizes this bottle. The information processing device 300 transits to Step S114.

At Step S108, the information processing device 300 determines whether it detects the input for deleting the bottle index (i.e., the deletion command), and if detected (Yes at Step S108), it transits to Step S109, and if not detected (No at Step S108), it transits to Step S111.

At Step S109, the information processing device 300 displays on the I/O device 400A the screen where the bottle index is deleted according to the deletion command of the bottle index. For example, as illustrated in FIG. 12, the deletion of the bottle index is performed by specifying the internal area of the circle indicative of the position index of the bottle index.

Next, at Step S110, the information processing device 300 outputs to the robot control device 600 the information on the bottle corresponding to the bottle index to be deleted. The robot control device 600 excludes the information on the bottle to be deleted from the information on the bottles to be processed by the robot 100A. The information processing device 300 transits to Step S114.

At Step S111, the information processing device 300 determines whether it detects the input for adding the bottle index (i.e., the addition command), and if detected (Yes at Step S111), it transits to Step S112, and if not detected (No at Step S111), it transits to Step S114.

At Step S112, the information processing device 300 detects the position index, the posture index, and the size index of the new bottle index according to the contents of the addition command of the bottle index, and displays the new bottle index on the I/O device 400A. For example, as illustrated in FIGS. 14 and 15, the addition of the bottle index is performed, after the center position of the circle indicative of the new position index is identified, by extending the arrow corresponding to the new posture index and the new size index from the center position.

Next, at Step S113, the information processing device 300 adds and detects the information on the actual bottle which includes the ID, the 3D center of gravity position, the 3D posture, the size classification, and the color classification of the bottle corresponding to the new bottle index, and outputs it to the robot control device 600. The robot control device 600 adds the information on the bottle corresponding to the new bottle index to the information on the bottles to be processed by the robot 100A, and recognizes this bottle. The information processing device 300 transits to Step S114.

At Step S114, the information processing device 300 determines whether it is a timing at which an image is newly captured by the imaging device 500, and if it is the timing (Yes at Step S114), it returns to Step S101, and if it has not yet reached the timing (No at Step S114), it returns to Step S105. The information processing device 300 may be provided with a timer or a clock for measuring time.

As described above, each time the image is captured by the imaging device 500, the information processing device 300 generates and displays the first superimposed image and the second superimposed image by using the captured image, and outputs to the robot control device 600 the 3D center of gravity position, the 3D posture, the size classification, and the color classification of the bottle corresponding to each of the bottle indexes included in each superimposed image. Further, when the correction, the deletion, or the addition of the bottle index is performed, the information processing device 300 outputs to the robot control device 600 the information including the 3D center of gravity position, the 3D posture, the size classification, and the color classification of the bottle corresponding to the corrected, deleted, or added bottle index. The operator can visually recognize the first superimposed image and the second superimposed image on the screen and judge whether the bottle index is proper or improper, and can perform the correction, the deletion, or the addition of the bottle index on the screen. In this embodiment, the correction, the deletion, and the addition of the bottle index are possible by a combination of only the tap and the slide on the screen. The robot control device 600 can recognize each bottle by not only using the information on the bottle which is automatically detected by the information processing device 300, but also the information on the bottle corresponding to the bottle index that is corrected, deleted or added by the operator, and can control the robots 100A and 100B.

<Effects Etc.>

In the information processing device 300 according to this embodiment, the input analysis modules 3007 and 3008 function as the position detecting module which detects the commanded position of the bottle specified on the screen where the target bottle is projected, function as the size detecting module which detects the commanded size of the bottle specified on the screen. The converter modules 3009 and 3010 function as the positional information detecting module which detects the position of the actual bottle based on the commanded position, function as the size information detecting module which detects the size of the actual bottle based on the commanded size, and output the object information including information on the position and the size of the actual bottle as an output module. The index processing modules 3003 and 3004 generate the position index indicative of the commanded position and the size index indicative of the size of the actual bottle, and display them on the screen. Note that the input analysis modules 3007 and 3008 may detect the size corresponding to the locus formed by the command made on the screen as the commanded size.

According to the above configuration, the information processing device 300 detects and outputs the position and the size of the actual bottle based on the position and the size of the bottle which is specified on the screen where the bottle is projected. Therefore, the information processing device 300 enables the setup on the screen for recognizing the actual bottle included in the image. Further, the information processing device 300 generates the position index and the size index of the bottle (i.e., the index indicative of the commanded contents), and displays them on the screen. Therefore, it becomes easier to recognize the position and the size of the bottle on the screen.

Moreover, the converter modules 3009 and 3010 may output the object information to the robot control device 600 which controls the robots 100A and 100B for performing the processing work to the actual bottles. According to the configuration, the robot control device 600 can recognize the actual bottle by using the object information, and can cause the robots 100A and 100B to perform the processing work of the bottles based on the recognition result. Therefore, it becomes possible to improve the operating accuracy of the robots 100A and 100B.

In the information processing device 300 according to this embodiment, the image processing module 3002 may function as a first image processing module which extracts the bottle from the image by processing the image where the bottle is projected, and detect the position and the size of the actual bottle which are extracted. The index processing modules 3003 and 3004 may generate and display the position index and the size index corresponding to the position and the size of the actual bottle which are detected by the image processing module 3002. According to the configuration, by processing the image where the bottle is projected, the information processing device 300 can automatically generate and display the position index and the size index of the bottle.

Further, the input analysis modules 3007 and 3008 may detect the command for the correction or the deletion of the position index that is made on the screen, and may correct or delete the commanded position according to the command. Moreover, the converter modules 3009 and 3010 may correct or delete the information on the position of the actual bottle based on the commanded position that is corrected or deleted, and may output the object information including information on the position. The index processing modules 3003 and 3004 may correct or delete the position index based on the commanded position that is corrected or deleted. According to the configuration, the information processing device 300 can accept the correction and the deletion of the position index displayed on the screen, and can reflect this correction and deletion to the position index and the information on the position of the actual bottle corresponding to this position index.

Further, the input analysis modules 3007 and 3008 may detect the command for the correction or the deletion of the size index made on the screen, and may correct or delete the commanded size according to this command. The converter modules 3009 and 3010 may correct or delete the information on the size of the actual bottle based on the commanded size that is corrected or deleted, and may output the object information including information on the size. Further, the index processing modules 3003 and 3004 may correct or delete the size index based on the size of the actual bottle which is corrected or deleted. According to the configuration, the information processing device 300 can accept the correction and deletion of the size index displayed on the screen, and can reflect this correction and deletion to the size index and the information on the size of the actual bottle corresponding to the size index.

In the information processing device 300 according to this embodiment, the input analysis modules 3007 and 3008 function as the position detecting module which detects the commanded position of the bottle on the screen where the bottle is projected, function as the posture detecting module which detects the commanded posture of the bottle commanded on the screen. The converter modules 3009 and 3010 function as the positional information detecting module which detects the position of the actual bottle based on commanded position, function as the posture information detecting module which detects the posture of the actual bottle based on the commanded posture, and output the object information including information on the position and the posture of the actual bottle. The index processing modules 3003 and 3004 generate the position index indicative of the commanded position and the posture index indicative of the commanded posture, and display them on the screen. Note that the input analysis modules 3007 and 3008 may detect the direction corresponding to the locus formed by the command made on the screen as the commanded posture.

According to the above configuration, the information processing device 300 detects and outputs the position and posture of the actual bottle based on the position and posture of the bottle which are commanded on the screen where the bottle is projected. Therefore, the information processing device 300 enables the setup on the screen for recognizing the actual bottle included in the image. Further, in order to generate the position index and the posture index of the bottle and display them on the screen, the information processing device 300 enables an easier recognition of the position and the posture of the bottle on the screen.

Moreover, the input analysis modules 3007 and 3008 may detect the commanded size of the bottle which is commanded on the screen, and the converter modules 3009 and 3010 may detect the size of the actual bottle based on the commanded size, and output the object information which further includes the information on the size. Further, the index processing modules 3003 and 3004 may further generate the size index of the bottle and display it on the screen. According to the configuration, the information processing device 300 detects and outputs the position, the posture, and the size of the actual bottle based on the commanded position, the commanded posture, and commanded size which are commanded on the screen. Therefore, the information processing device 300 improves the recognition accuracy of the actual bottle. Further, in order to generate the position index, the posture index, and the size index of the bottle and display them on the screen, the information processing device 300 enables an easier recognition of the position, the posture, and the size of the bottle on the screen.

Moreover, by processing the image where the bottle is projected, the image processing module 3002 may detect the position and posture of the actual bottle, and the index processing modules 3003 and 3004 may generate and display the position index and the posture index corresponding to the position and posture of the actual bottle. According to the configuration, by processing the image where the bottle is projected, the information processing device 300 can automatically generate and display the position index and the posture index of the bottle.

Further, the image processing module 3002 may function as a second image processing module which detects the size of the actual bottle by processing the image where the bottle is projected, and the index processing modules 3003 and 3004 may generate and display the size index corresponding to the size of the actual bottle. According to the configuration, by processing the image where the bottle is projected, the information processing device 300 can automatically generate and display the position index, the posture index, and the size index of the bottle.

The input analysis modules 3007 and 3008 may detect the command for correction or a deletion of the posture index that is made on the screen, and correct or delete the commanded posture according to the command. Further, the converter modules 3009 and 3010 may correct or delete the information on the posture of the actual bottle based on the commanded posture that is corrected or deleted, and output the object information including information on the posture. Moreover, the index processing modules 3003 and 3004 may correct or delete the posture index based on the commanded posture that is corrected or deleted. According to the configuration, the information processing device 300 can accept the correction and deletion to the posture index displayed on the screen, and can reflect this correction and deletion to the posture index and the information on the actual posture of the bottle corresponding to the posture index.

Further, the setting apparatus 10 according to this embodiment includes the information processing device 300, and the I/O devices 400A and 400B, and the I/O devices 400A and 400B include the display which displays the screen, and the input device which accepts the input of the command and outputs it to the information processing device 300. For example, the I/O devices 400A and 400B may be provided with the touchscreen 410 including the function of the display and the function of the input device. According to the configuration, similar effects to the information processing device 300 according to this embodiment can be acquired. Further, the setting apparatus enables the input of the setup for recognizing the actual bottle included in the image.

The image recognition system 20 according to this embodiment includes the setting apparatus 10, and the imaging device 500 which images the actual bottle and outputs the captured image to the setting apparatus 10. According to the configuration, similar effects to the information processing device 300 according to this embodiment can be acquired. Further, the image recognition system 20 enables the setup for imaging the actual bottle and recognizing the actual bottle included in the captured image.

Further, in the image recognition system 20 according to this embodiment, the image processing module 3002 of the information processing device 300 may function as a third image processing module which detects the position, size, and posture of the actual bottle by processing the image in which the actual bottle is imaged. Moreover, the index processing modules 3003 and 3004 may generate the position index, the size index, and the posture index corresponding to the actual position, size, and posture of the bottle detected by the image processing module 3002, and may display them on the display screen. According to the configuration, the image recognition system can automatically generate and display the position index, the posture index, and the size index of the bottle by using the image captured by the imaging device 500.

The robot system 1 according to this embodiment includes the image recognition system 20, the robots 100A and 100B which perform the processing work to the actual bottle, and the robot control device 600 which controls the robots 100A and 100B. The robot control device 600 recognizes the actual bottle by using the object information outputted from the information processing device 300, and causes the robots 100A and 100B to process the actual bottle. According to the configuration, the robot system 1 can automatically detect the position, the posture, and the size of the actual bottle by using the image captured by the imaging device 500, and can apply them to the control of the robots 100A and 100B. Further, the robot system 1 can accept the setup of the position index, the posture index, and/or the size index of the bottle via the screens of the I/O devices 400A and 400B, and can reflect the accepted setup to the position, the posture, and the size of the actual bottle. Therefore, the robot system 1 enables the highly-accurate control of the robots 100A and 100B.

Other Embodiments

As described above, although examples of the embodiment of the present disclosure are described, the present disclosure is not limited to the above embodiment. That is, various modifications and improvements are possible within the scope of the present disclosure. For example, modes in which various modifications are applied to the above embodiment, and modes built by combining the components of different embodiments are also encompassed in the scope of the present disclosure.

For example, although in this embodiment the bottle index that is the object index includes the position index, the posture index, and the size index, indexes included in the object index is not limited to these indexes. The object index may include at least either one of the position index, the posture index, or the size index. For example, the object index may not include the position index when the position of the object is known beforehand, it may not include the posture index when the object does not have the orientation like a sphere, and it may not include the size index when the sizes of the objects are the same. Further, the object information processed by the information processing device 300 may include at least either one of the information, such as the position, the posture, or the size of the actual object.

Moreover, although in this embodiment, as the method of inputting the information on the correction, the deletion, and the addition of the bottle index into the I/O devices 400A and 400B, the combined input method of the tap and the slide to the touchscreen 410 with the finger or the pen is used, it is not limited to this configuration. The input method may be any method as long as it can detect the position, the direction, and the distance. For example, the input of the direction and the distance may be an input for specifying a starting point and an ending point.

Although in this embodiment the input analysis modules 3007 and 3008 of the information processing device 300 detect the size classification of the commanded size inputted into the touchscreen 410 and output it to the converter modules 3009 and 3010, they are not limited to this configuration. For example, the converter modules 3009 and 3010 may detect the size classification from the commanded size received from the input analysis modules 3007 and 3008. The size classification may not be used. For example, the input analysis modules 3007 and 3008 output the commanded size to the converter modules 3009 and 3010, and the converter modules 3009 and 3010 may detect the size of the actual bottle by using the commanded size.

Further, although in this embodiment the I/O devices 400A and 400B are provided with the touchscreen 410 in order to display by the screen and to accept the input of the information on the correction, the deletion, and the addition of the bottle index, they are not limited to this configuration. For example, the I/O devices 400A and 400B may be separately provided with the display for the screen display, and the input device for accepting the input. For example, the I/O devices 400A and 400B may be configured to operate a commanding element, such as a pointer and a cursor on the display screen, according to the command inputted into the input device. For example, the input device may be a device including a cross button, a push switch, a lever, a dial, a joystick, a mouse, and a key.

Further, although in this embodiment the information processing device 300 processes the same image captured by the imaging device 500, and generates the first image in which the edge of the transparent bottle is exaggerated and the second image in which the edge of the colored bottle is exaggerated, it is not limited to this configuration. For example, imaging devices 500 may be provided corresponding to the robots 100. Then, the information processing device 300 may process the image captured by the first imaging device 500 corresponding to the first robot 100A to generate the first image, and process the image captured by the second imaging device 500 corresponding to the second robot 100B to generate the second image.

Information processing devices 300 may be provided corresponding to the robots 100. For example, the first information processing device 300 corresponding to the first robot 100A may perform processing related to the first image, and the second information processing device 300 corresponding to the second robot 100B may perform processing related to the second image.

Further, although in this embodiment the robot 100 is the horizontal articulated industrial robot, it may be configured, for example, as a vertical articulated robot, a polar coordinate robot, a cylindrical coordinate robot, a Cartesian coordinate robot, or other industrial robots, without being limited to the horizontal articulated robot. The robot 100 may be other than the industrial robots, and may be a service robot, a construction machinery, a crane, a cargo conveyance vehicle, a humanoid, etc. The service robot is a robot used in various service industries, such as nursing, medical science, cleaning, guard, guidance, rescue, cooking, and goods offering.

The art of the present disclosure may be a setting method. For example, the setting method according to one aspect of the present disclosure is a method of setting the position and the size of the object for recognizing the actual object projected on the screen. The method includes detecting the commanded position that is the position of the object commanded on the screen, detecting the commanded size that is the size of the object commanded on the screen, detecting the position of the actual object based on the commanded position, detecting the size of the actual object based on the commanded size, generating the position index indicative of the commanded position and the size index indicative of the size of the actual object and displaying them on the screen, and outputting the object information including information on the position and the size of the actual object.

Further, the setting method according to another aspect of the present disclosure is a method of setting the position and the posture of the object for recognizing the actual object projected on the screen. The method includes detecting the commanded position that is the position of the object commanded on the screen, detecting the commanded posture that is the posture of the object commanded on the screen, detecting the position of the actual object based on the commanded position, detecting the posture of the actual object based on the commanded posture, generating the position index indicative of the commanded position and the posture index indicative of the commanded posture and displaying them on the screen, and outputting the object information including information on the position and the posture of the actual object.

In the setting method according to the another aspect of the present disclosure, the method may include detecting the commanded size that is the size of the object commanded on the screen, detecting the size of the actual object based on the commanded size, further generating the size index indicative of the size of the actual object and displaying it on the screen, and outputting the object information further including the information on the size of the actual object.

According to the above setting method, similar effects to the information processing device 300 etc. can be acquired. Such a setting method may be implemented by a circuit such as a CPU and an LSI, an IC card, or a sole module.

The art of the present disclosure may be a program for implementing the setting method described above, or may be a non-transitory computer-readable recording medium where the program is recorded. Further, it is needless to say that the program can be distributed via a transmission medium, such as the Internet.

Further, all the numbers, such as the ordinal number and the quantity, used in the above are to illustrate in order to concretely describe the art of the present disclosure, and therefore, the present disclosure is not limited to the illustrated numbers. Moreover, the relations of connection between the components are to illustrate in order to concretely describe the art of the present disclosure, and therefore, the relations of connection which realize the functions of the present disclosure are not limited to the relations.

Further, the division of blocks in the functional block diagram is one example, and therefore, blocks may be realized as one block, one block may be divided into blocks, and/or a part of the functions may be transferred to other blocks. Further, the functions of blocks having similar functions may be processed by sole hardware or software in a parallel or time-dividing manner.

[Modifications]

Below, modifications to the above embodiment are described. In this example, the image processing module 3002 of the information processing device 300 illustrated in FIG. 6 achieves the improvement in the recognition accuracy by using a learned model which is generated beforehand by machine learning and detecting the position, the color and the size of the bottle from the camera image generated by the imaging device 500.

In the following description, a learning phase where the learned model is generated, an operation phase where the learned model is used, and a relearning of the learned model will be described in detail.

(1) Learning Phase

Figures 19, 20:
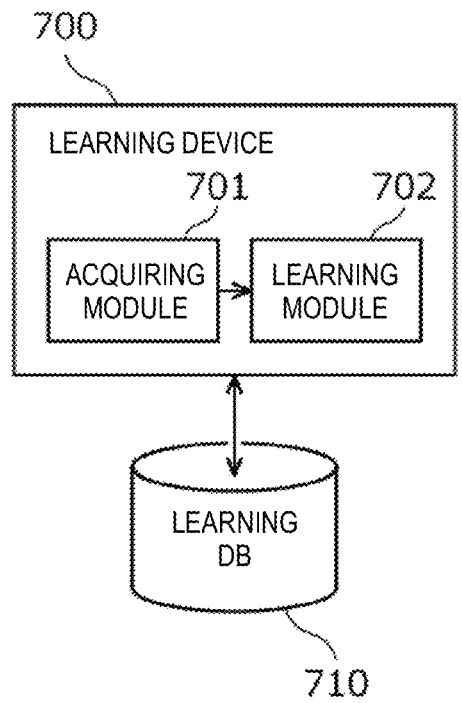
FIG. 19 is a block diagram illustrating one example of a functional configuration of a learning device according to a modification.
FIG. 20 is a view illustrating one example of the contents of a learning database.

FIG. 19 is a block diagram illustrating one example of a functional configuration of a learning device 700. FIG. 20 is a view illustrating one example of the contents of a learning DB (database) 710.

The learning device 700 generates a learned model for estimating the position, the color, and the size of the bottle in the image by using a learning data set which is saved in the learning DB 710.

The learning device 700 is a computer including a CPU, a RAM, a ROM, a nonvolatile memory, and an input/output interface. The CPU of the learning device 700 performs information processing according to a program loaded to the RAM from the ROM or the nonvolatile memory.

The learning device 700 includes an acquiring module 701 and a learning module 702. These functional parts are implemented by the CPU of the learning device 700 executing the information processing according to the program.

The acquiring module 701 acquires the learning data set from the learning DB 710.

The learning module 702 generates the learned model for estimating the position, the color, and the size of the bottle in the image by the machine learning using the learning data set acquired by the acquiring module 701.

As illustrated in FIG. 20, the learning DB 710 stores the learning data set in which a learning image, a class, and a position are associated with each other. The learning image is used as input data. The class and the position are used as teaching data.

The learning image is an image including an image of the bottle which is the object. For example, the learning image is an image generated by the imaging device 500 (see FIG. 1) which images the bottle W on the belt conveyor 200. The learning image is not limited to the configuration, but may be an image obtained by imaging the bottle at other places.

The class and the position are a class and a position of the bottle which are included in the learning image. For example, the class and the position of the bottle are judged and inputted by a human.

The class of the bottle is classified into, for example, "transparent bottle; large," "transparent bottle; small," "colored bottle; large," and "colored bottle; small." Whether it is the transparent bottle or the colored bottle indicates the color of the bottle. Whether it is large or small indicates the size of the bottle. The color and the size of the bottle are one example of the attribute of the bottle.

The position of the bottle is a position of the bottle in the learning image, and, for example, it is expressed by coordinates of a boundary box which includes the bottle. The coordinates of the boundary box include xy coordinates of the upper left end, the width, and the height. For example, the position of the bottle is not limited to this configuration, but may be expressed by coordinates of a representative point, such as the center position. The representative point is one location in the bottle image inside the learning image.

Figure 21:
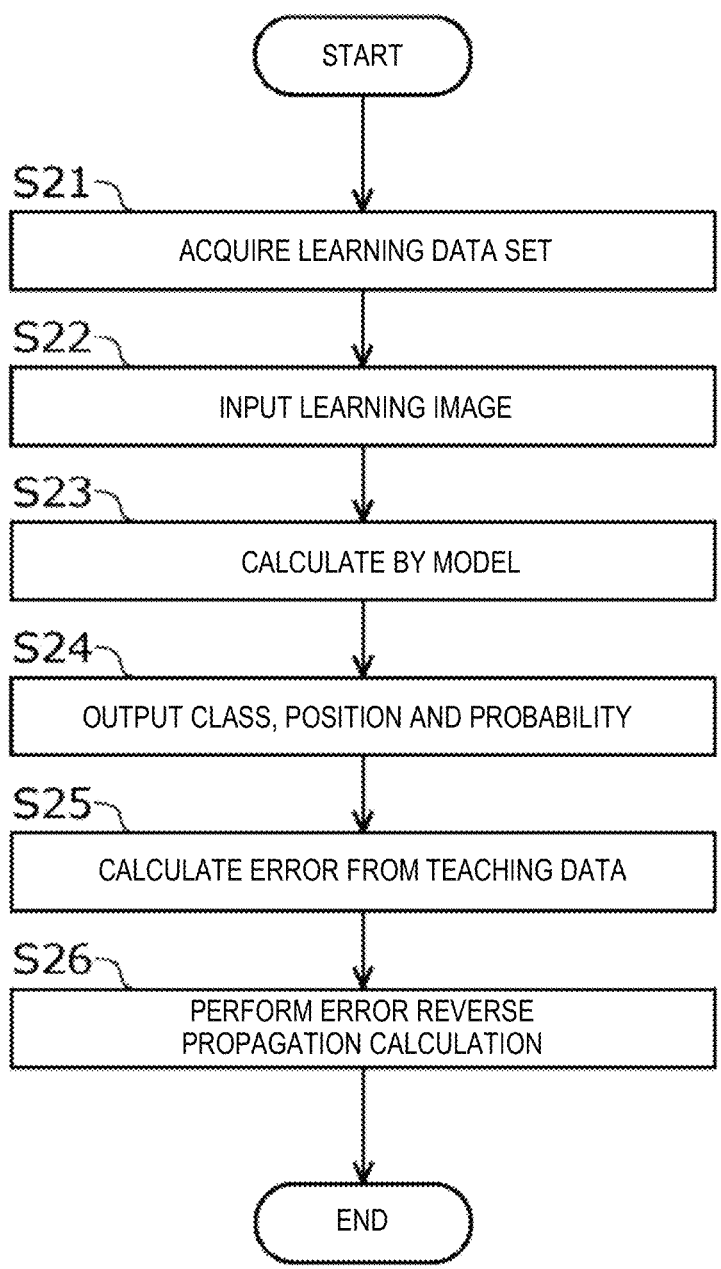
FIG. 21 is a view illustrating one example of a procedure for generating a learned model.
Figure 22:
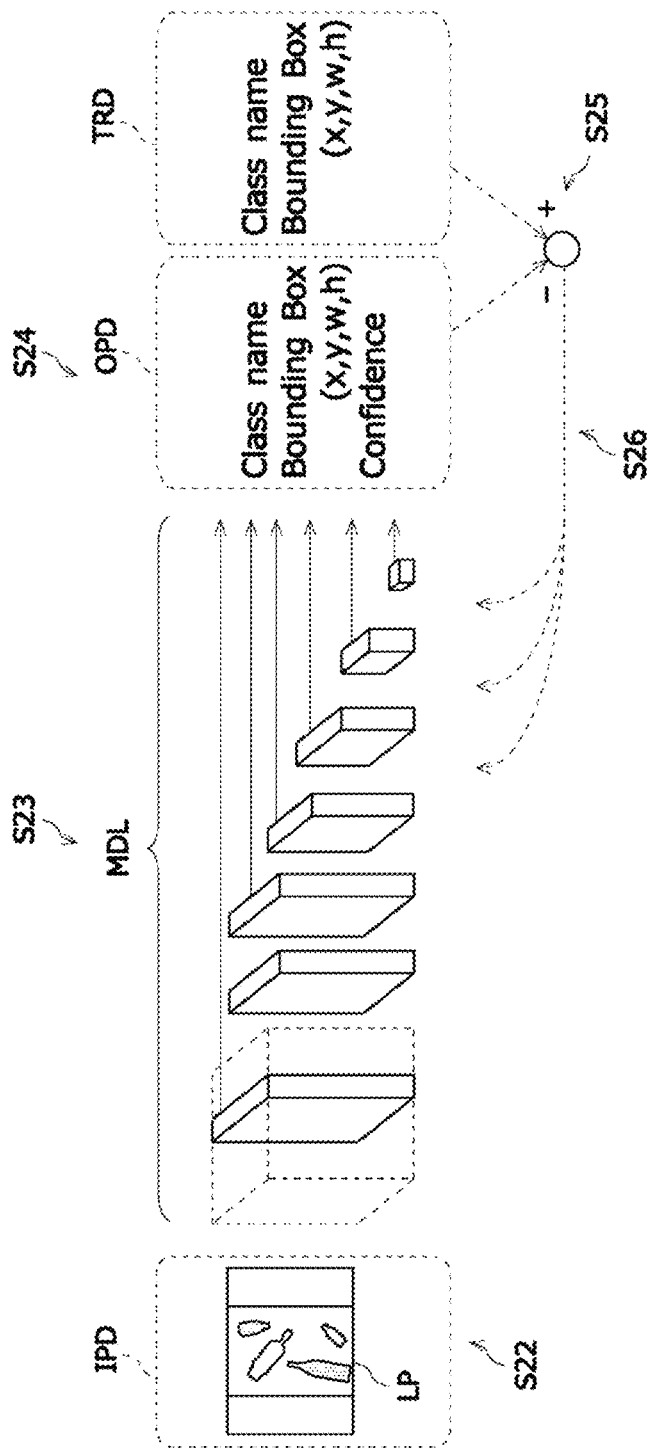
FIG. 22 is a view illustrating the generation of the learned model.

FIG. 21 is a view illustrating one example of a procedure for the generation of the learned model implemented by the learning device 700. The generation processing of the learned model is initiated by the user's operation. FIG. 22 is a view illustrating the generation of the learned model. In this drawing, a step number of the processing is given to a part corresponding to each processing of FIG. 21.

In this example, for example, an object detection model MDL, such as an SSD (Single Shot MultiBox Detector), is used. In the output layer of the object detection model MDL, the class (Class name), the coordinates of the boundary box (Bounding Box (x, y, w, h)), and the probability (Confidence) are provided. Without being limited to the SSD, Mask R-CNN or YOLO (You Only Look Once) may also be used.

Without being limited to the object detection model MDL, a region segmentation model, such as Semantic Segmentation or Instance Segmentation, which performs a region segmentation of the image may be used, or a characteristic point detection model, such as Keypoint Detection, which detects characteristic points in the image may be used.

As illustrated in FIG. 21, at Step S21, the acquiring module 701 acquires the learning data set including the learning image, the class, and the position from the learning DB 710.

At Step S22, the learning module 702 inputs a learning image LP into the object detection model MDL as input data IPD. At Step S23, the learning module 702 performs a calculation by the object detection model MDL. At Step S24, the learning module 702 outputs the class, the position, and the probability from the object detection model MDL as output data OPD. The class indicates the color and the size of the bottle.

At Step S25, the learning module 702 calculates errors of the class and the position as output data OPD from the class and the position as teaching data TRD. At Step S26, the learning module 702 performs an error reverse propagation calculation to reduce the error.

By repeating the above procedure, the learned model for estimating the position, the color, and the size of the bottle in the image (that is, a learned object detection model) is generated. The generated learned model is used in the following operation phase.

(2) Operation Phase

Figure 23:
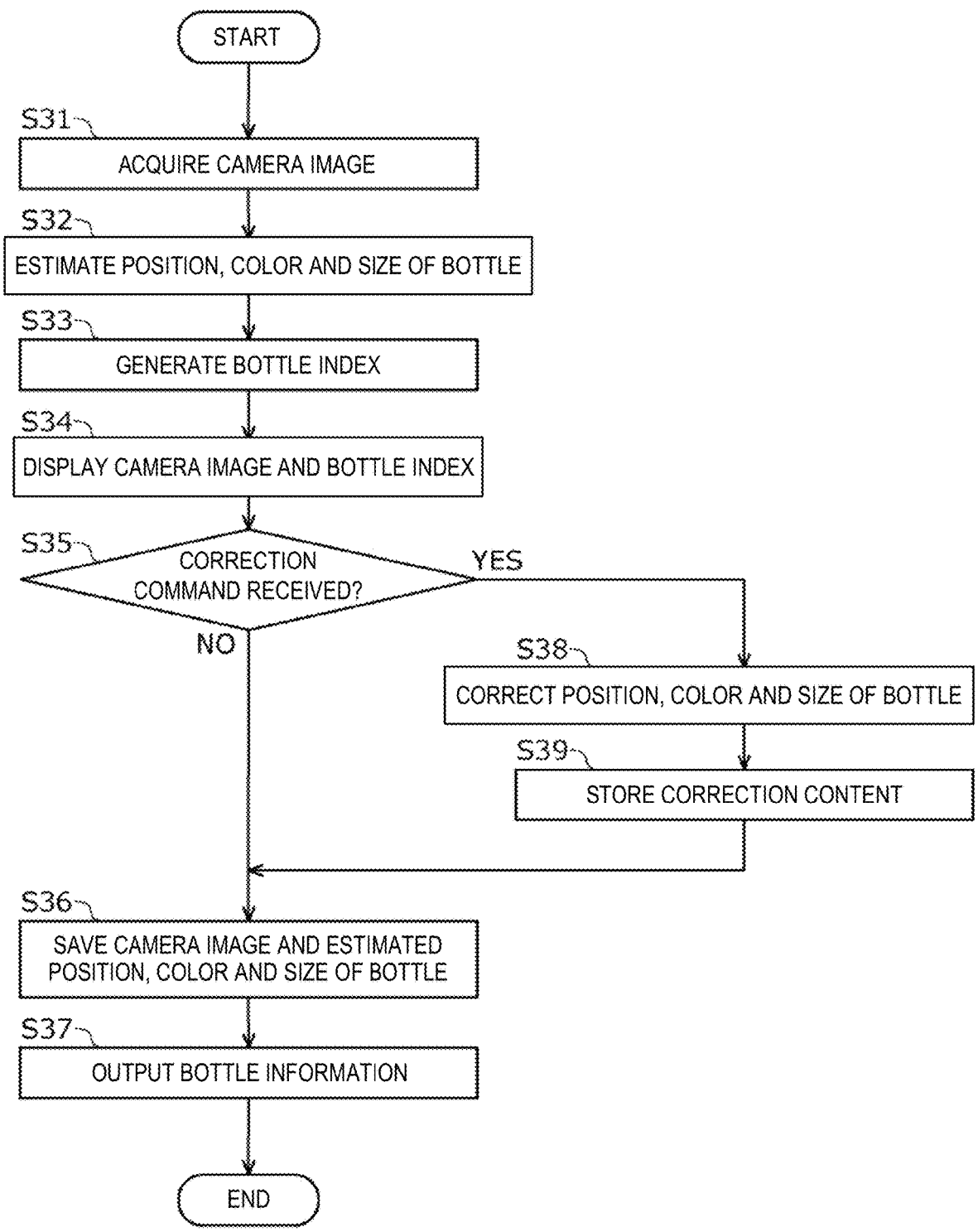
FIG. 23 is a view illustrating one example of a procedure for identification processing using the learned model.
Figure 24:
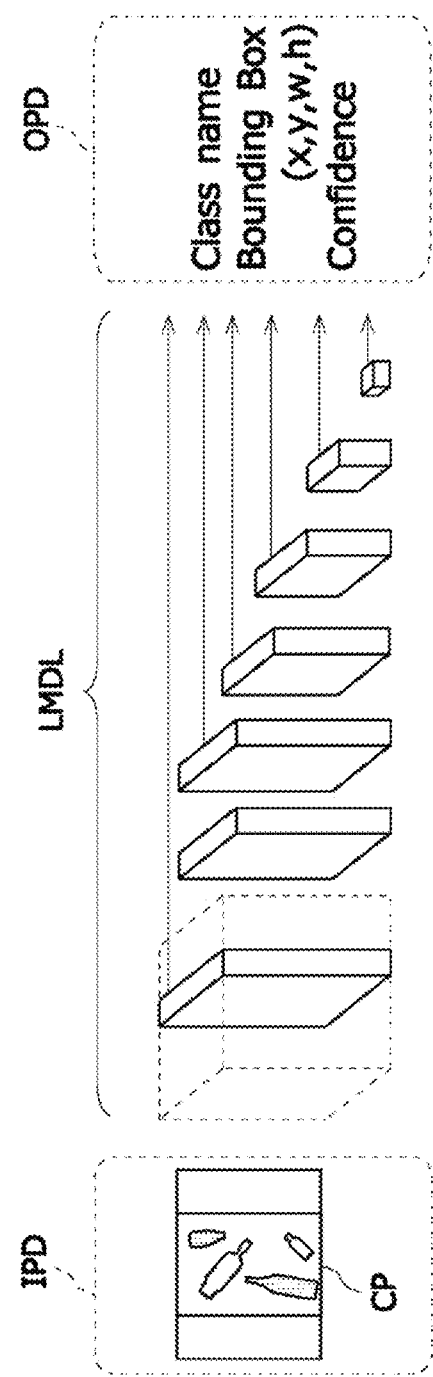
FIG. 24 is a view illustrating the identification processing using the learned model.

FIG. 23 is a view illustrating one example of a procedure for identification processing using the learned model implemented in the robot system 1. The identification processing is initiated when the imaging device 500 images the bottle W on the belt conveyor 200. FIG. 24 is a view illustrating the identification processing using the learned model. Note that, in the following description, a relation with each functional part of the information processing device 300 illustrated in FIG. 6 is also described.

At Step S31, the information processing device 300 acquires a camera image CP generated by the imaging device 500 (processing as the imaging control module 3001).

At Step S32, the information processing device 300 estimates the position, the color, and the size of the bottle in the camera image CP by using a learned model LMDL generated in the learning phase described above (processing as the image processing module 3002).

In detail, as illustrated in FIG. 24, the information processing device 300 inputs the camera image CP into the learned model LMDL as the input data IPD, performs a calculation by the learned model LMDL, and outputs the class, the position, and the probability as the output data OPD. The class indicates the color and the size of the bottle. The position indicates the coordinates of the boundary box including the bottle. The information processing device 300 may calculate the coordinates of the representative point, such as the center position of the boundary box, based on the coordinates of the boundary box, and use it as the position of the bottle.

Without being limited to this configuration, it may directly estimate the coordinates of the representative point of the bottle in the camera image CP by using the region segmentation model, such as Keypoint Detection, which detects the characteristic point in the image. Alternatively, it may estimate a segment of the bottle in the camera image using the region segmentation model, such as Semantic Segmentation, which performs the segment division of the image, calculate the coordinates of the representative point, such as the center position of the segment, and use it as the position of the bottle.

At Step S33, the information processing device 300 generates the bottle index based on the estimated position, color, and size of the bottle (processing as the index processing modules 3003 and 3004).

In detail, the information processing device 300 generates the bottle index of the transparent bottle, when the color of the estimated bottle is the transparent bottle (processing as the first index processing module 3003). Further, when the color of the estimated bottle is the colored bottle, the information processing device 300 generates the bottle index of the colored bottle (processing as the second index processing module 3004). The bottle index includes the position index based on the position of the estimated bottle, and the size index based on the size of the estimated bottle.

At Step S34, the information processing device 300 displays the camera image and the bottle index on the touchscreens 410 of the I/O devices 400A and 400B (processing as the image synthesis modules 3005 and 3006).

In detail, the information processing device 300 synthesizes the camera image with the image of the bottle index of the transparent bottle, and outputs it to the I/O device 400A (processing as the first image synthesis module 3005). The information processing device 300 synthesizes the camera image with the image of the bottle index of the colored bottle, and outputs it to the I/O device 400B (processing as the second image synthesis module 3006). The synthesized image is similar to the superimposed images illustrated, for example, in FIGS. 8 and 9. Note that the camera image and the image of the bottle index may be displayed side by side.

At Step S35, if there is no command for the correction to the displayed bottle index (S35: NO), the information processing device 300 transits to Step S36. At Step S36, the information processing device 300 saves the camera image acquired at Step S31, and the position, the color, and the size of the bottle estimated at Step S32.

At Step S37, the information processing device 300 outputs to the robot control device 600 the bottle information corresponding to the bottle index (processing as the index processing modules 3003 and 3004). The bottle information includes the information on the position, the color and the size of the bottle.

On the other hand, at Step S35, if there is a command for the correction to the displayed bottle index (S35: YES), the information processing device 300 transits to Step S38. At Step S38, the information processing device 300 corrects at least either one of the position, the color, or the size of the bottle based on the command for the correction (processing as the input analysis modules 3007 and 3008).

In detail, the information processing device 300 detects the command for the correction to the displayed bottle index by analyzing the inputted information inputted into the touchscreens 410 of the I/O devices 400A and 400B. The correction to the bottle index is similar to the correction of the bottle index illustrated, for example, in FIGS. 10 to 16. Here, the correction to the bottle index includes a deletion and an addition of the bottle index.

At Step S39, the information processing device 300 saves the contents of the correction (processing as a saving processing module). In detail, the information processing device 300 associates at least either one of the corrected position, the color, or the size of the bottle with the camera image, and saves it in a correction saving DB (database) 3013 built in the memory module 3012.

Figure 25:
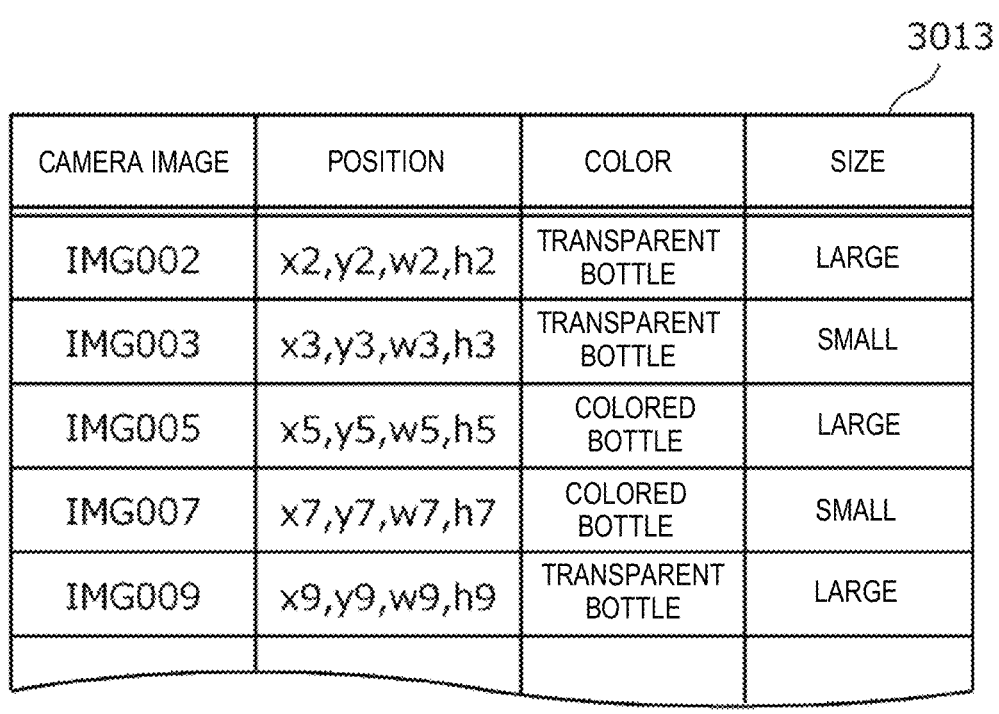
FIG. 25 is a view illustrating one example of the contents of a correction saving database.

FIG. 25 is a view illustrating one example of the contents of the correction saving DB 3013. In the correction saving DB 3013, the position, the color, and the size of the bottle are associated with the camera image, and at least either one of the position, the color, or the size of the bottle is corrected.

For example, when the position of the bottle is corrected, the information processing device 300 associates and saves the corrected position of the bottle with the camera image and the color and the size of the bottle which are not corrected.

The items saved in the correction saving DB 3013 correspond to the items saved in the learning database 710 (see FIG. 20). That is, the camera image corresponds to the learning image, the position of the bottle corresponds to the position, and the color and the size of the bottle correspond to the class.

After the execution of Step S39, Steps S36 and S37 described above are executed. Note that Steps S36, S37, and S38 may be executed in parallel.

(3) Relearning

Relearning of the learned model is performed by the learning device 700 illustrated in FIG. 19 using the contents of the correction saved in the correction saving DB 3013.

The acquiring module 701 of the learning device 700 acquires the camera image, and the position, the color, and the size of the bottle from the correction saving DB 3013. The learning module 702 of the learning device 700 uses the camera image as the input data, and performs a relearning of the learned model by using the position, the color, and the size of the bottle as the teaching data. Since the concrete processing of the relearning is similar to the processing illustrated in FIGS. 21 and 22, the detailed description is omitted.

In the modification described above, the learning device 700 uses the learning image LP as the input data IPD and uses the position and the attribute of the bottle in the learning image LP as the teaching data TRD, and generates the learned model for estimating the position and the attribute of the bottle in the camera image CP by the machine learning. According to this, the learned model for improving the recognition accuracy can be generated.

Further, in this modification, the information processing device 300 detects the position and the attribute of the bottle from the camera image CP using the learned model LMDL generated by the learning device 700. According to this, the recognition accuracy can be improved by using the learned model.

Further, in this modification, the information processing device 300 associates and saves the camera image CP and at least either one of the position, the color, or the size of the bottle which are corrected according to the correction command to the bottle index made on the screen. According to this, the contents of the correction judged and inputted by the user can be used for the relearning.

Further, in this modification, the learning device 700 uses the camera image CP saved by the information processing device 300 as the input data and uses at least either one of the corrected position, color, or size of the bottle as the teaching data, and performs the relearning of the learned model LMDL. According to this, since the relearning is performed by using the contents of the correction judged and inputted by the user, the recognition accuracy of the learned model can be further improved.

Although in the modification described above the color and the size of the bottle are described as examples of the attribute of the bottle detected by the image processing, the attribute of the bottle is not limited to these. The attribute of the bottle includes the size, the posture, the color, or the state of the bottle, for example.

For example, the posture of the bottle may be used as the attribute of the bottle similar to the above embodiment. Further, the state of the bottle where the bottle is broken or the label is adhered to the bottle may be used as the attribute of the bottle.

Note that, in the information processing device 300 illustrated in FIG. 6, the input analysis modules 3007 and 3008 are examples of an attribute detecting module which detects a commanded attribute, and the converter modules 3009 and 3010 are examples of an attribute information detecting module which detects the attribute of the actual object.

In the modification described above, the camera image CP generated by the imaging device 500 which images the object is used. Here, the imaging device 500 is one example of a sensing part, and the camera image CP is one example of the detection image generated by the sensing part.

Instead of the imaging device 500, a stereoscopic camera or a TOF (Time-of-Flight) camera which generates the detection image indicative of the 3D position of the object may be used as the sensing part. In this case, the detection image indicative of the 3D position similarly generated is used for the learning image LP, in addition to the camera image CP.

Moreover, instead of the imaging device 500, a LiDAR (Light Detection And Ranging) which emits light and generates a detection image indicative of the distance of the object using reflected light of the emitted light may be used as the sensing part. In this case, the detection image indicative of the distance of the object similarly generated is used for the learning image LP, in addition to the camera image CP.

What is claimed is:

1. An information processing device, comprising:
position detecting circuitry configured to detect a commanded position that is a position of an object commanded on a screen where the object is projected;
attribute detecting circuitry configured to detect a commanded attribute that is an attribute of the object commanded on the screen;
positional information detecting circuitry configured to detect a position of an actual object based on the commanded position;
attribute information detecting circuitry configured to detect an attribute of the actual object based on the commanded attribute;
index processing circuitry configured to generate a position index indicative of the commanded position and an attribute index indicative of the attribute of the actual object, and display the position index and the attribute index on the screen; and
output circuitry configured to output object information including information on the position and the attribute of the actual object,
wherein the attribute detecting circuitry is size detecting circuitry configured to detect a commanded size that is a size of the object commanded on the screen,
wherein the attribute information detecting circuitry is size information detecting circuitry configured to detect a size of the actual object based on the commanded size,
wherein the index processing circuitry generates the second index indicative of the commanded position and a size index indicative of the size of the actual object, and displays the position index and the size index on the screen,
wherein the output circuitry outputs the object information including information on the position and the size of the actual object,
wherein the position detecting circuitry detects a command for a correction or a deletion of the position index made on the screen, and corrects or deletes the commanded position according to the command,
wherein the positional information detecting circuitry corrects or deletes the information on the position of the actual object based on the corrected or deleted commanded position,
wherein the index processing circuitry corrects or deletes the position index based on the corrected or deleted commanded position, and
wherein the output circuitry outputs the object information including the corrected or deleted information on the position of the actual object.

2. The information processing device of claim 1, further comprising:
first image processing circuitry configured to extract the object from an image by processing the image where the object is projected, and detect the position and the size of the actual object corresponding to the extracted object,
wherein the index processing circuitry generates and displays the position index, and the size index corresponding to the position and the size of the actual object detected by the first image processing circuitry.

3. An information processing device, comprising:
position detecting circuitry configured to detect a commanded position that is a position of an object commanded on a screen where the object is projected:
attribute detecting circuitry configured to detect a commanded attribute that is an attribute of the object commanded on the screen;
positional information detecting circuitry configured to detect a position of an actual object based on the commanded position;
attribute information detecting circuitry configured to detect an attribute of the actual object based on the commanded attribute;
index processing circuitry configured to generate a position index indicative of the commanded position and an attribute index indicative of the attribute of the actual object, and display the position index and the attribute index on the screen; and
output circuitry configured to output object information including information on the position and the attribute of the actual object,
wherein the attribute detecting circuitry is size detecting circuitry configured to detect a commanded size that is a size of the object commanded on the screen,
wherein the attribute information detecting circuitry is size information detecting circuitry configured to detect a size of the actual object based on the commanded size,
wherein the index processing circuitry generates the position index indicative of the commanded position and a size index indicative of the size of the actual object, and displays the position index and the size index on the screen,
wherein the output circuitry outputs the object information including information on the position and the size of the actual object,
wherein the size detecting circuitry detects a command for a correction or a deletion of the size index made on the screen, and corrects or deletes the commanded size according to the command,
wherein the size information detecting circuitry corrects or deletes the information on the size of the actual object based on the corrected or deleted commanded size,
wherein the index processing circuitry corrects or deletes the size index based on the corrected or deleted size of the actual object, and
wherein the output circuitry outputs the object information including the corrected or deleted information on the size of the actual object.

4. The information processing device of claim 1, wherein the size detecting circuitry detects a size corresponding to a locus formed by the command made on the screen as the commanded size.

5. The information processing device of claim 1, wherein the output circuitry outputs the object information to a controller adapted to control a robot that performs a processing work to the actual object.

6. An information processing device, comprising:
position detecting circuitry configured to detect a commanded position that is a position of an object commanded on a screen where the object is projected;
attribute detecting circuitry configured to detect a commanded attribute that is an attribute of the object commanded on the screen;

positional information detecting circuitry configured to detect a position of an actual object based on the commanded position;

attribute information detecting circuitry configured to detect an attribute of the actual object based on the commanded attribute;

index processing circuitry configured to generate a position index indicative of the commanded position and an attribute index indicative of the attribute of the actual object, and display the position index and the attribute index on the screen; and output circuitry configured to output object information including information on the position and the attribute of the actual object, wherein the attribute detecting circuitry is posture detecting circuitry configured to detect a commanded posture that is a posture of the object commanded on the screen, wherein the attribute information detecting circuitry is posture information detecting circuitry configured to detect a posture of the actual object based on the commanded posture, wherein the index processing circuitry generates the position index indicative of the commanded position and a posture index indicative of the commanded posture, and displays the position index and the posture index on the screen, wherein the output circuitry outputs object information including information on the position and the posture of the actual object, wherein the posture detecting circuitry detects a command for a correction or a deletion of the posture index made on the screen, and corrects or deletes the commanded posture according to the command, wherein the posture information detecting circuitry corrects or deletes the information on the posture of the actual object based on the corrected or deleted commanded posture, wherein the index processing circuitry corrects or deletes the posture index based on the corrected or deleted commanded posture, and wherein the output circuitry outputs the object information including the corrected or deleted information on the posture of the actual object.

7. The information processing device of claim 6, further comprising first image processing circuitry configured to process an image where the object is projected to extract the object from the image, and detect the position and the posture of the actual object corresponding to the extracted object, wherein the index processing circuitry generates and displays the position index and the posture index corresponding to the position and the posture of the actual object detected by the first image processing circuitry.

8. The information processing device of claim 6, wherein the posture detecting circuitry detects a direction corresponding to a locus formed by the command made on the screen as the commanded posture.

9. The information processing device of claim 6, further comprising:

size detecting circuitry configured to detect a commanded size that is a size of the object commanded on the screen; and size information detecting circuitry configured to detect a size of the actual object based on the commanded size, wherein the index processing circuitry further generates a size index indicative of the size of the actual object and displays the size index on the screen, and wherein the output circuitry outputs the object information further including information on the size of the actual object.

10. The information processing device of claim 9, further comprising second image processing circuitry configured to process an image where the object is projected to extract the object from the image, and detect the size of the actual object corresponding to the extracted object, wherein the index processing circuitry generates and displays the size index corresponding to the size of the actual object detected by the second image processing circuitry.

11. The information processing device of claim 9, wherein the size detecting circuitry detects a command for a correction or a deletion of the size index made on the screen, and corrects or deletes the commanded size according to the command, wherein the size information detecting circuitry corrects or deletes the information on the size of the actual object based on the corrected or deleted commanded size, wherein the index processing circuitry corrects or deletes the size index based on the corrected or deleted size of the actual object, and wherein the output circuitry outputs the object information including the corrected or deleted information on the size of the actual object.

12. The information processing device of claim 9, wherein the size detecting circuitry detects a size corresponding to a locus formed by the command made on the screen as the commanded size.

13. The information processing device of claim 6, wherein the position detecting circuitry detects a command for a correction or a deletion of the position index made on the screen, and corrects or deletes the commanded position according to the command, wherein the positional information detecting circuitry corrects or deletes the information on the position of the actual object based on the corrected or deleted commanded position, wherein the index processing circuitry corrects or deletes the position index based on the corrected or deleted commanded position, and wherein the output circuitry outputs the object information including the corrected or deleted information on the position of the actual object.

14. The information processing device of claim 6, wherein the output circuitry outputs the object information to a controller adapted to control a robot that performs a processing work to the actual object.

15. The information processing device of claim 1, further comprising image processing circuitry configured to process an image where the object is projected to detect the position and the attribute of the actual object from the image, wherein the index processing circuitry generates and displays the position index and the attribute index corresponding to the position and the attribute of the actual object detected by the image processing circuitry.

16. The information processing device of claim 15, wherein the image processing circuitry detects the position and the attribute of the actual object from the image by using a learned model generated beforehand by machine learning, the learned model using a learning image as input data and using the position and the attribute of the object included in the learning image as teaching data.

17. The information processing device of claim 15, wherein the position detecting circuitry detects a command for a correction of the position index made on the screen, and corrects the commanded position according to the command, and the device further comprises saving processing circuitry configured to save the corrected commanded position so as to be associated with the image.

18. The information processing device of claim 15, wherein the attribute detecting circuitry detects a command for a correction of the attribute index made on the screen, and corrects the commanded attribute according to the command, and the device further comprises saving processing circuitry configured to save the corrected commanded attribute so as to be associated with the image.

19. The information processing device of claim 15, wherein the image is a detection image generated by a sensing part configured to sense the object.

20. The information processing device of claim 1, wherein the attribute of the object is a size, a posture, a color, or a state of the object.

21. A processing method comprising:
acquiring data of a first image in which an object is captured;
generating data of a second image in which an edge of the object is exaggerated, by processing the data of the first image;
detecting, by processing the data of the second image, an object index that includes, as a component index or component indexes, one or more of a position index indicative of a position of the object on the second image, a size index indicative of a size of the object on the second image and a posture index indicative of a posture of the object on the second image;
generating, by processing the data of the second image, data of a third image that superimposedly indicates the object index on the object of the second image, and outputting the data of the third image to a display;
detecting, by processing the data of the first image or the data of the second image, a first object information that includes, as actual information, one or more of information of a position of an actual object, information of a size of the actual object and information of a posture of the actual object;
outputting the first object information to control circuitry adapted to control a robot that performs a processing work to the actual object;
in response to receiving a changing command that commands a correction, a deletion or an addition of the component index with respect to a first object index which is the object index in the third image displayed on the display, generating a second object index by changing the first object index in accordance with the changing command, and outputting data of the third image that superimposedly indicates the second object index on the object, to the display;
generating, based on the component index or component indexes included in the second object index, a second object information by changing the actual information of the first object information; and
outputting the second object information to the control circuitry.

22. A non-transitory computer readable medium storing a program, the program for causing a computer to execute processing comprising:
in response to acquiring data of a first image in which an object is captured, generating data of a second image in which an edge of the object is exaggerated, by processing the data of the first image;
detecting, by processing the data of the second image, an object index that includes, as a component index or component indexes, one or more of a position index indicative of a position of the object on the second image, a size index indicative of a size of the object on the second image and a posture index indicative of a posture of the object on the second image;
generating, by processing the data of the second image, data of a third image that superimposedly indicates the object index on the object of the second image, and outputting the data of the third image to a display;
detecting, by processing the data of the first image or the data of the second image, a first object information that includes, as actual information, one or more of information of a position of an actual object, information of a size of the actual object and information of a posture of the actual object;
outputting the first object information to control circuitry adapted to control a robot that performs a processing work to the actual object;
in response to receiving a changing command that commands a correction, a deletion or an addition of the component index with respect to a first object index which is the object index in the third image displayed on the display, generating a second object index by changing the first object index in accordance with the changing command, and outputting data of the third image that superimposedly indicates the second object index on the object, to the display;
generating, based on the component index or component indexes included in the second object index, a second object information by changing the actual information of the first object information; and
outputting the second object information to the control circuitry.

* * * * *